(12) United States Patent
Kishiyama et al.

(10) Patent No.: US 11,171,819 B2
(45) Date of Patent: Nov. 9, 2021

(54) BASE STATION, SYNCHRONIZATION SIGNAL TRANSMISSION METHOD, AND USER EQUIPMENT TERMINAL, AND CELL SEARCH METHOD

(71) Applicant: NTT DOCOMO, INC., Tokyo (JP)

(72) Inventors: Yoshihisa Kishiyama, Tokyo (JP); Satoshi Nagata, Tokyo (JP); Keisuke Saito, Tokyo (JP); Mamoru Sawahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 21 days.

(21) Appl. No.: 16/466,216

(22) PCT Filed: Dec. 14, 2017

(86) PCT No.: PCT/JP2017/044803
§ 371 (c)(1),
(2) Date: Jun. 3, 2019

(87) PCT Pub. No.: WO2018/131375
PCT Pub. Date: Jul. 19, 2018

(65) Prior Publication Data
US 2020/0067753 A1 Feb. 27, 2020

(30) Foreign Application Priority Data

Jan. 11, 2017 (JP) .............................. JP2017-002626

(51) Int. Cl.
*H04W 72/04* (2009.01)
*H04L 27/26* (2006.01)
*H04L 5/00* (2006.01)

(52) U.S. Cl.
CPC ...... *H04L 27/2657* (2013.01); *H04L 27/2613* (2013.01); *H04L 27/2675* (2013.01); *H04L 27/2695* (2013.01); *H04L 5/0007* (2013.01)

(58) Field of Classification Search
None
See application file for complete search history.

(56) References Cited

U.S. PATENT DOCUMENTS

| 8,634,363 B2 * | 1/2014 | Kim ...................... H04L 5/0035 370/329 |
| 9,344,241 B2 * | 5/2016 | Benjebbour .......... H04L 5/0048 |

(Continued)

FOREIGN PATENT DOCUMENTS

| JP | 2016213530 A | 12/2016 |
| WO | 2009041069 A1 | 4/2009 |

OTHER PUBLICATIONS

3GPP TS 36.211 V13.2.0; "3rd Generation Partnership Project; Technical Specification Group Radio Access Network; Evolved Universal Terrestrial Radio Access (E-UTRA); Physical channels and modulation (Release 13)"; Jun. 2016 (168 pages).

(Continued)

*Primary Examiner* — Sithu Ko
(74) *Attorney, Agent, or Firm* — Osha Bergman Watanabe & Burton LLP

(57) ABSTRACT

A base station for transmitting a synchronization signal from N transmission antennas (N>=2) in orthogonal frequency division multiple access includes a signal sequence generation unit configured to generate a synchronization signal sequence to be used for the synchronization signal in a frequency domain; a subcarrier mapping unit configured to divide a transmission band of the synchronization signal into K frequency blocks (K>=2) and map the synchronization signal sequence into one or more subcarriers in the K frequency blocks; a precoding unit configured to generate N precoding vectors to be multiplied by the synchronization signal sequence in the frequency domain and multiply the synchronization signal sequence to be transmitted from an n-th antenna (1<=n<=N) by at least an n-th precoding (Continued)

vector; and a transmission unit configured to transmit the synchronization signal from the N transmission antennas.

2 Claims, 20 Drawing Sheets

(56) References Cited

U.S. PATENT DOCUMENTS

| | | | | |
|---|---|---|---|---|
| 9,743,384 | B2* | 8/2017 | Nagata | H04L 5/0048 |
| 9,991,983 | B2* | 6/2018 | Seo | H04J 11/0076 |
| 2010/0034077 | A1* | 2/2010 | Ishii | H04L 27/2614 |
| | | | | 370/210 |
| 2010/0272034 | A1* | 10/2010 | Imai | H04L 25/0204 |
| | | | | 370/329 |
| 2019/0058558 | A1* | 2/2019 | Lee | H04L 5/0007 |

OTHER PUBLICATIONS

Qualcomm Incorporated; "NB-PSS and NB-SSS Design"; 3GPP TSG Ran WG1 Meeting #84 R1-161116; St. Julian's, Malta, Feb. 15-19, 2016 (17 pages).

Qualcomm Incorporated; "NB-PSS and NB-SSS Design (Revised)"; 3GPP TSG Ran WG1 NB-IoT Ad-Hoc Meeting R1-161981; Sophia Antipolis, France, Mar. 22-24, 2016 (24 pages).

Shimura et al.; "Effect of PVS Transmit Diversity on Initial Cell Search Method Using Two-step Frequency Offset Estimation in Heterogeneous Networks"; IEICE technical report, RCS2016-102, vol. 116, No. 147, pp. 47-52; Jul. 22, 2016 (8 pages).

International Search Report issued for PCT/JP2017/044803, dated Mar. 13, 2018 (5 pages).

Written Opinion issued for PCT/JP2017/044803, dated Mar. 13, 2018 (4 pages).

* cited by examiner

BASE STATION, SYNCHRONIZATION SIGNAL TRANSMISSION METHOD, AND USER EQUIPMENT TERMINAL, AND CELL SEARCH METHOD

TECHNICAL FIELD

The present invention relates to a base station, a synchronization signal transmission method, a user equipment terminal, and a cell search method.

BACKGROUND ART

In the 3rd Generation Partnership Project (3GPP), a Narrowband-Internet-of-Things (NB-IoT) radio interface is defined based on a Long Term Evolution (LTE) radio interface to efficiently multiplex IoT traffic (see Non-Patent Document 1). For the NB-IoT radio interface, a synchronization signal is used to detect a cell ID, as in LTE. A cell ID is referred to as a "physical cell identity (physical cell ID or PCID)", and thus hereinafter may be expressed as a PCID. The synchronization signal includes a primary synchronization signal (PSS) and a secondary synchronization signal (SSS). A scheme of multiplexing a PSS and an SSS in NB-IoT is different from that of multiplexing a PSS and an SSS in LTE, and will be described below.

A channel bandwidth in NB-IoT is twelve subcarriers (equal to 180 kHz) corresponding to one resource block (RB) in LTE. An in-band scenario in which NB-IoT is included in a frequency spectrum for LTE will be described below.

FIG. 1 illustrates a scheme of multiplexing a PSS and an SSS according to an in-band scenario. The PSS is multiplexed into the sixth subframe for each radio frame with the length of 10 ms. The SSS is multiplexed into the tenth subframe for every 20 ms, that is, for each even-numbered radio frame.

FIGS. 2 and 3 illustrate schemes of multiplexing a PSS and an SSS in a subframe, respectively. In LTE, a physical downlink control channel (PDCCH) is multiplexed within the first three OFDM symbol intervals in each subframe. According to the in-band scenario, the PSS and the SSS are multiplexed within eleven OFDM symbol intervals from the fourth OFDM symbol to the fourteenth OFDM symbol in the subframe, in order not to interfere with the PDCCH. The PSS and the SSS are punctured in a resource element (RE) into which a cell-specific reference signal (CRS) is multiplexed. In order to improve the probability of detecting a PCID, the PSS and the SSS are periodically transmitted. Specifically, the PSS and the SSS are periodically multiplexed and transmitted at the time intervals of 10 ms and 20 ms, respectively. In a guard-band scenario and a stand-alone scenario, the PSS and the SSS need not be punctured in the RE into which the CRS is multiplexed. However, as in the in-band scenario, the PSS and the SSS are multiplexed within the eleven OFDM symbol intervals except for the first three OFDM symbol intervals in each subframe.

Next, a PSS sequence and an SSS sequence will be described. In LTE, five hundred and four PCIDs can be identified based on one hundred sixty-eight SSS sequences corresponding to IDs of base stations (also referred to as "eNBs" or "eNodeBs") and three PSS sequences representing cell numbers of three cells in the same base station. In contrast to LTE, in NB-IoT, five hundred and four PCIDs can be identified only based on the SSS sequences.

The PSS sequence is represented as a sequence formed by modulating a Zadoff-Chu sequence with a binary sequence within eleven OFDM symbol intervals in the subframe. The modulation using the binary values, +1 and −1, is referred to as "code cover". The Zadoff-Chu sequence corresponding to an OFDM symbol (an FFT block length) is used within the eleven OFDM symbols in the subframe. Synchronization of OFDM symbol timing can be detected by correlating consecutive OFDM symbols which use the Zadoff-Chu sequence. However, since eleven correlation peaks occur in the subframe according to the Zadoff-Chu sequence, the eleven symbols are multiplied by the code cover. The orthogonal code cover sequence is represented as $S(l)=\{1\ 1\ 1\ 1\ -1\ -1\ 1\ 1\ 1\ -1\ 1\}$, $(l=3, 4, \ldots, 13)$. FIG. 4 illustrates a scheme of generating a PSS symbol (sequence) in NB-IoT. A Zadoff-Chu sequence with a sequence length of 11 is generated in the frequency domain. A PSS sequence corresponding to an OFDM symbol index l in the frequency domain is expressed in the following equation.

$$d_l(n) = S(l) \cdot e^{-j\frac{\pi u n(n+1)}{11}}, n = 0, 1, \ldots, 10 \qquad (1)$$

In the equation (1), u=5 is a root index. The Zadoff-Chu sequence in the frequency domain is mapped into a subcarrier, and a Zadoff-Chu sequence in the time domain is generated by means of IFFT. A cyclic prefix (CP) is inserted into each FFT block. A PSS symbol (sequence) is generated by multiplying eleven FFT blocks including the CP by the binary modulation sequence (code cover). As described below, the leading edge of the eleven OFDM symbol intervals can be determined by detecting cross-correlation among a plurality of OFDM symbols.

The SSS sequence is multiplexed into the last subframe, that is, the tenth subframe which has the subframe index 9 for every 20 ms. The SSS sequence represents one of five hundred and four PCIDs and is used to detect a super-frame of 80 ms. The SSS sequence is generated by a combination of a Zadoff-Chu sequence with the sequence length of 131 in the frequency domain and a binary scrambling sequence. One of the five hundred and four PCIDs is identified by one hundred twenty-six root indexes and four Hadamard sequence scrambling codes. The SSS sequence is represented in the following equation.

$$d(n) = b_q(m) \cdot e^{-j2\pi\theta_f n} e^{-j\frac{\pi u \hat{n}(\hat{n}+1)}{131}} \qquad (2)$$

In the equation (2), n=0, 1, . . . , 131 and $\hat{n}$=n mod 131.

$$e^{-j\frac{\pi u \hat{n}(\hat{n}+1)}{131}}$$

is a Zadoff-Chu sequence and u is one of one hundred twenty-six root indexes expressed in the following equation.

$$u = N_{ID}^{Ncell} \bmod 126 + 3 \qquad (3)$$

In the equation (3), $N_{ID}^{Ncell}$ is a PCID in NB-IoT. $b_q(m)$ represents one of four Hadamard sequences with the sequence length of 128. m=n mod 128 and $$q = \left\lfloor \frac{N_{ID}^{Ncell}}{126} \right\rfloor.$$

$e^{-j2\pi\theta_f n}$ is a term representing cyclic shift of the sequence according to a frame number $n_f$ and used to establish synchronization at the time interval of 80 ms. The amount of cyclic shift $\theta_f$ is expressed in the following equation.

$$\theta_f = \frac{33}{132}\left(\frac{n_f}{2}\right) \bmod 4 \qquad (4)$$

FIG. 5 illustrates a scheme of generating an SSS symbol (sequence) in NB-IoT. A Zadoff-Chu sequence with the sequence length of 131 is generated in the frequency domain. The Zadoff-Chu sequence in the frequency domain is mapped into a subcarrier and a Zadoff-Chu sequence in the time domain is generated by means of IFFT. A cyclic prefix (CP) is inserted into each FFT block. An SSS symbol (sequence) is generated by multiplying the FFT block including the CP by a binary scrambling sequence.

In LTE, transmission diversity with precoding vector switching (PVS) is applied to a PSS and an SSS. FIG. 6 illustrates a transmission scheme according to PVS transmission diversity in LTE. In LTE, two sets of PSSs and SSSs are multiplexed in the radio frame of 10 ms. These sets are multiplied by precoding vectors of {1,1} and {1,−1}, respectively. The same set of the PSS and the SSS is multiplied by the corresponding precoding vector.

A PSS and an SSS are channels which a user equipment terminal (UE or user equipment) first captures in a downlink. In order to simplify detection processing of the PSS and the SSS in the UE, selection transmission diversity is adopted because the base station need not modify a signal waveform used for single antenna transmission. Among the selection transmission diversity, PVS transmission diversity is adopted because transmission power of a two-stream transmitter can be efficiently used. In LTE, a set of a PSS and an SSS is multiplexed at the time intervals of 5 ms. The PSS and the SSS in the same set are multiplied by the corresponding precoding vector. A receiver can estimate channel responses at respective subcarrier positions based on the first-detected PSS sequence, and in-phase combine correlation values of the SSS sequence in the frequency domain using the estimation result of the channel responses at the respective carrier positions.

When the correlation values at the respective subcarrier positions are in-phase combined over a plurality of subcarriers, a noise component can be reduced compared to the case where power is combined, and thus misdetection of the SSS sequence can be also reduced. As described above, because the same set of the PSS and the SSS is multiplied by the corresponding precoding vector, the UE can in-phase combine SSS correlation values using the channel responses at the respective subcarrier positions which are estimated using the PSS without being aware of (detecting) the precoding vector.

PRIOR-ART DOCUMENTS

Non-Patent Documents

[Non-Patent Document 1] 3GPP TS 36.211, "Evolved UTRA; Physical channels and modulation (Release 13)," V13.2.0, June 2016
[Non-Patent Document 2] 3GPP TSG RAN WG1 #84 R1-161116, "NB-PSS and NB-SSS Design," Qualcomm Incorporated, February 2016
[Non-Patent Document 3] 3GPP TSG RAN WG1 NB-IoT Ad-Hoc Meeting R1-161981, "NB-PSS and NB-SSS Design (Revised)," Qualcomm Incorporated, March 2016

DISCLOSURE OF INVENTION

Problem(s) to be Solved by the Invention

Non-Patent Documents 2 and 3 propose a transmission scheme when PVS transmission diversity is applied to a PSS and an SSS in the time domain in NB-IoT. FIG. 7 illustrates the transmission scheme when PVS transmission diversity is applied to a PSS and an SSS as proposed in Non-Patent Documents 2 and 3. According to the PVS transmission diversity scheme in Non-Patent Documents 2 and 3, precoding vectors for both the PSS and the SSS are alternately switched. Since the time interval of multiplexing the PSS is 10 ms and is longer compared to LTE, it is necessary to process received signals with the length of 20 ms during a single detection loop, in order to obtain an effect of PVS transmission diversity. Further, since the time interval of multiplexing the SSS is 20 ms, it takes at least 40 ms during a single detection loop to detect an SSS sequence, in order to obtain an effect of PVS transmission diversity. When detection of a PCID is repeated during a plurality of loops, it takes much time to detect the PCID. When it takes much time to detect the PCID, the number of times that correlation detection processing is performed on the PSS and the SSS increases accordingly, and power consumption of a UE consequently increases. For a terminal with a severer constraint on power consumption such as a sensor terminal, in particular, it is necessary to enter an idle state at an earlier stage, by shortening time to detect a PCID.

It is an object of the present invention to provide a base station, a synchronization signal transmission method, a user equipment terminal, and a cell search method to shorten time to detect a PCID by applying a PVS transmission diversity scheme or a selection transmission diversity scheme to a synchronization signal in the frequency domain.

Means for Solving the Problem(s)

In one aspect of the present invention, there is provision for a base station for transmitting a synchronization signal from N transmission antennas (N>=2) in orthogonal frequency division multiple access (OFDMA), including:
a signal sequence generation unit configured to generate a synchronization signal sequence to be used for the synchronization signal in a frequency domain;
a subcarrier mapping unit configured to divide a transmission band of the synchronization signal into K frequency blocks (K>=2) and map the synchronization signal sequence into one or more subcarriers in the K frequency blocks;
a precoding unit configured to generate N precoding vectors to be multiplied by the synchronization signal sequence in the frequency domain and multiply the synchronization signal sequence to be transmitted from an n-th antenna (1<=n<=N) by at least an n-th precoding vector; and
a transmission unit configured to transmit the synchronization signal from the N transmission antennas.

Advantageous Effect of the Invention

According to the present invention, it is possible to shorten time to detect a PCID by applying a PVS transmission diversity scheme or a selection transmission diversity scheme to a synchronization signal in the frequency domain.

DETAILED DESCRIPTION OF THE PREFERRED EMBODIMENTS

Embodiments of the present invention are described below with reference to the drawings. The embodiments described below are merely presented for illustrative purpose, and the present invention is not limited to these embodiments. For example, it is assumed that a radio communication system according to these embodiments is an NB-IoT system which is based on LTE. However, the present invention is not limited to the NB-IoT system, but may be applied to an LTE system or any other system in which a PCID is detected using a synchronization signal.

<System Configuration>

Figure 8:
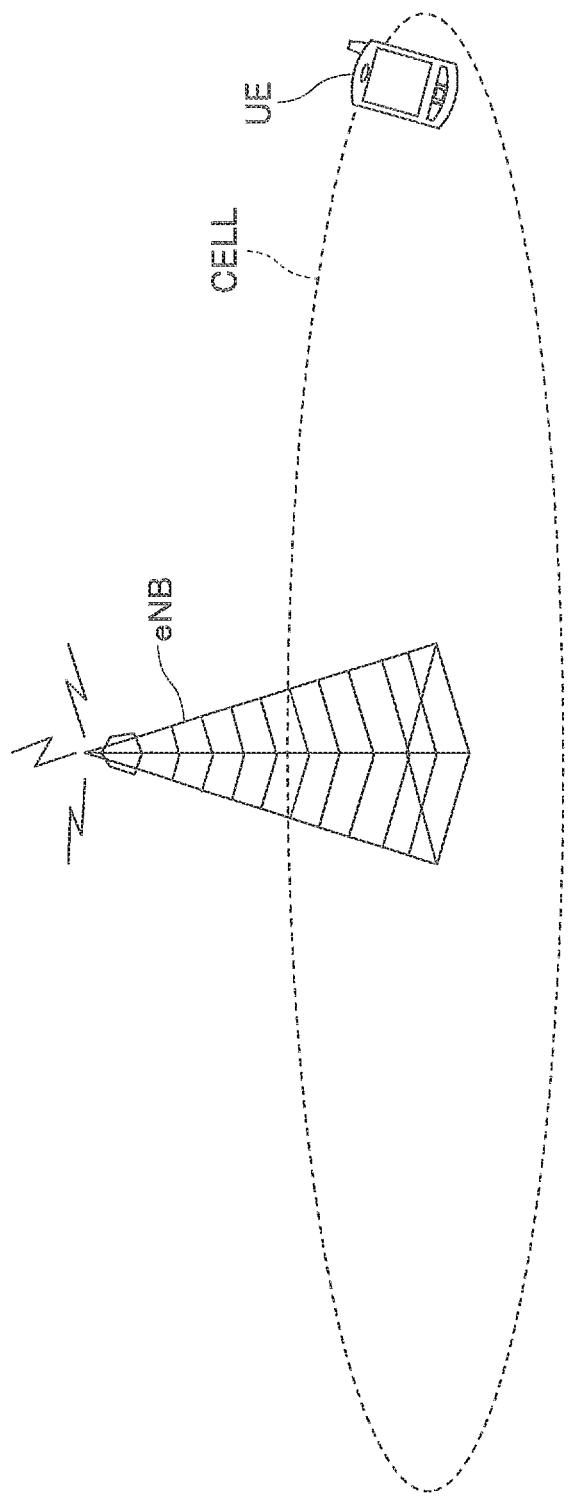
FIG. 8 is a conceptual diagram illustrating an exemplary configuration of a radio communication system according to an embodiment of the present invention.

FIG. 8 is a conceptual diagram illustrating an exemplary configuration of a radio communication system according to an embodiment of the present invention. As illustrated in FIG. 8, the radio communication system according to the embodiment of the present invention includes a base station eNB and a user equipment terminal UE. While a single base station eNB and a single user equipment terminal UE are illustrated in FIG. 8, a plurality of base stations eNBs or a plurality of user equipment terminals UEs may be included.

The base station eNB can accommodate one or more (for example, three) cells (also referred to as "sectors"). When the base station eNB accommodates a plurality of cells, the entire coverage area of the base station eNB can be divided into a plurality of smaller areas, and in each smaller area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" can be used interchangeably in this specification. In some cases, the base station eNB is also referred to as a fixed station, a NodeB, an eNodeB (eNB), an access point, a femto cell, a small cell, or the like.

In some cases, the user equipment terminal UE is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

In an LTE-based radio communication system, orthogonal frequency division multiple access (OFDMA) is adopted for a downlink and single carrier-frequency division multiple access (SC-FDMA) is adopted for an uplink.

The UE performs cell search to find a cell to be connected, in order to communicate with the eNB. A signal used for cell search is referred to as a "synchronization signal (SS)" and two types of synchronization signals, that is, a PSS and an SSS are used. In NB-IoT, the PSS is used for timing detection and is specifically used to detect FFT block timing, subframe timing, and radio frame timing, for example. The SSS is used for detection of a cell ID.

These signals are transmitted in a predetermined portion in a resource formed in the time domain and the frequency domain. A radio frame may be formed by one or more frames in the time domain. Each of one or more frames in the time domain is also referred to as a "subframe". Further, the subframe may be formed by one or more slots in the time domain. Further, the slot may be formed by one or more symbols (OFDM symbols, SC-FDMA symbols, or the like) in the time domain. Each of the radio frame, the subframe, the slot, and the symbol represents a time unit in which a signal is transmitted. The radio frame, the subframe, the slot, and the symbol may have different corresponding names. For example, in an LTE system, the base station performs scheduling to allocate a radio resource (a frequency bandwidth, transmission power, and/or the like which can be used by each user equipment terminal) to each user equipment terminal. A minimum time unit of scheduling may be referred to as a "transmission time interval (TTI)". For example, one subframe may be referred to as a TTI, a plurality of consecutive subframes may be referred to as a TTI, or one slot may be referred to as a TTI.

A resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be formed by one or more resource blocks. The structure of the radio frame as described above is merely an example, and the number of subframes included in the radio frame, the number of slots included in the subframe, the number of symbols and resources blocks included in the slot, and the number of subcarriers included in the resource block can be modified in any manner.

In the embodiment of the present invention, the eNB applies a PVS transmission diversity scheme or a selection transmission diversity scheme to a PSS and an SSS in the frequency domain. In the following embodiment, a method of detecting a cell ID with the same processing regardless of the diversity scheme used in the eNB will be also described.

<Configuration of Base Station Using Frequency-Domain PVS Transmission Diversity Scheme>

Figure 9:
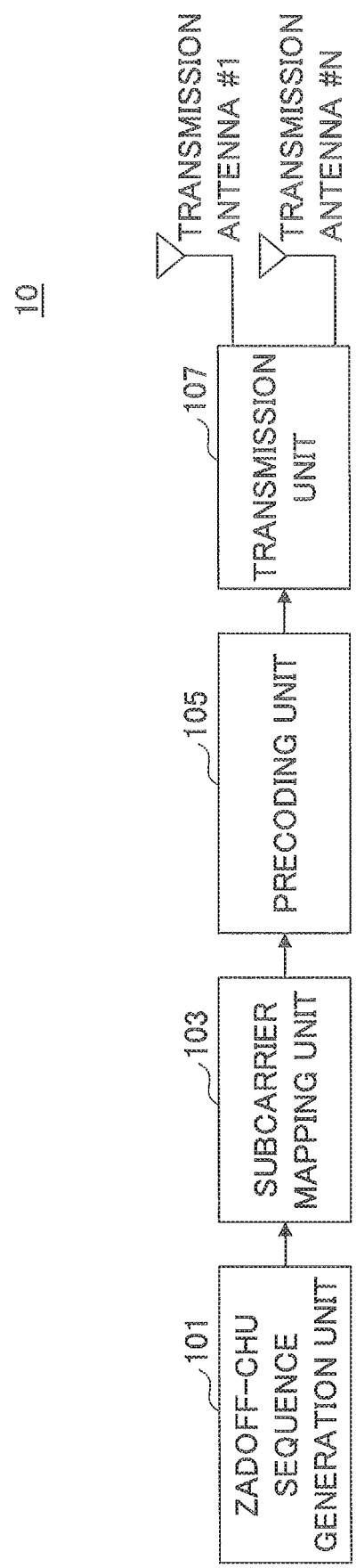
FIG. 9 is a block diagram of a base station according to one embodiment of the present invention.

FIG. 9 is a block diagram of a base station 10 according to one embodiment of the present invention. The base station 10 applies a PVS transmission diversity scheme to a synchronization signal in the frequency domain and transmits the synchronization signal from N transmission antennas (N>=2), so that a UE can perform cell search. It should be noted that the diversity scheme as described below can be applied not only to a PSS but also to an SSS. The base station 10 includes a Zadoff-Chu sequence generation unit 101, a subcarrier mapping unit 103, a precoding unit 105, and a transmission unit 107.

The Zadoff-Chu sequence generation unit 101 generates a Zadoff-Chu sequence that is a synchronization signal sequence to be used for the synchronization signal in the frequency domain. The Zadoff-Chu sequence generation unit 101 generates a PSS sequence that is a synchronization signal sequence to be used for a PSS and an SSS sequence that is a synchronization signal sequence to be used for an SSS.

The subcarrier mapping unit 103 divides a transmission band of the synchronization signal into K frequency blocks (K>=2) and maps the Zadoff-Chu sequence generated by the Zadoff-Chu sequence generation unit 101 into one or more subcarriers in the K frequency blocks. As the frequency-domain PVS transmission diversity scheme where the Zadoff-Chu sequence is mapped into K frequency blocks, a localized scheme or a distributed scheme may be used. The localized scheme is a scheme where the Zadoff-Chu sequence is mapped into two or more consecutive subcarriers and the distributed scheme is a scheme where the Zadoff-Chu sequence is discretely mapped on a per-subcarrier basis. Specific examples will be described below.

The precoding unit 105 generates N precoding vectors to be multiplied by the Zadoff-Chu sequence in the frequency domain and multiplies the PSS sequence and the SSS sequence to be transmitted from an n-th antenna (1<=n<=N) by at least an n-th precoding vector. While the number of frequency blocks (=K) may be different from the number of transmission antennas (=N), it is preferable that a condition N<=K be satisfied, because the use of a different precoding vector for each transmission antenna maximizes a transmission diversity effect.

The transmission unit 107 transmits the synchronization signal from the N transmission antennas. Specifically, the transmission unit 107 generates a Zadoff-Chu sequence in the time domain by means of IFFT. The transmission unit 107 inserts a cyclic prefix (CP) into each FFT block, generates a PSS symbol (sequence) or an SSS symbol (sequence) as the synchronization signal, and transmits it from the N transmission antennas.

Specific Examples of Frequency-Domain PVS Transmission Diversity Scheme

Figure 10:
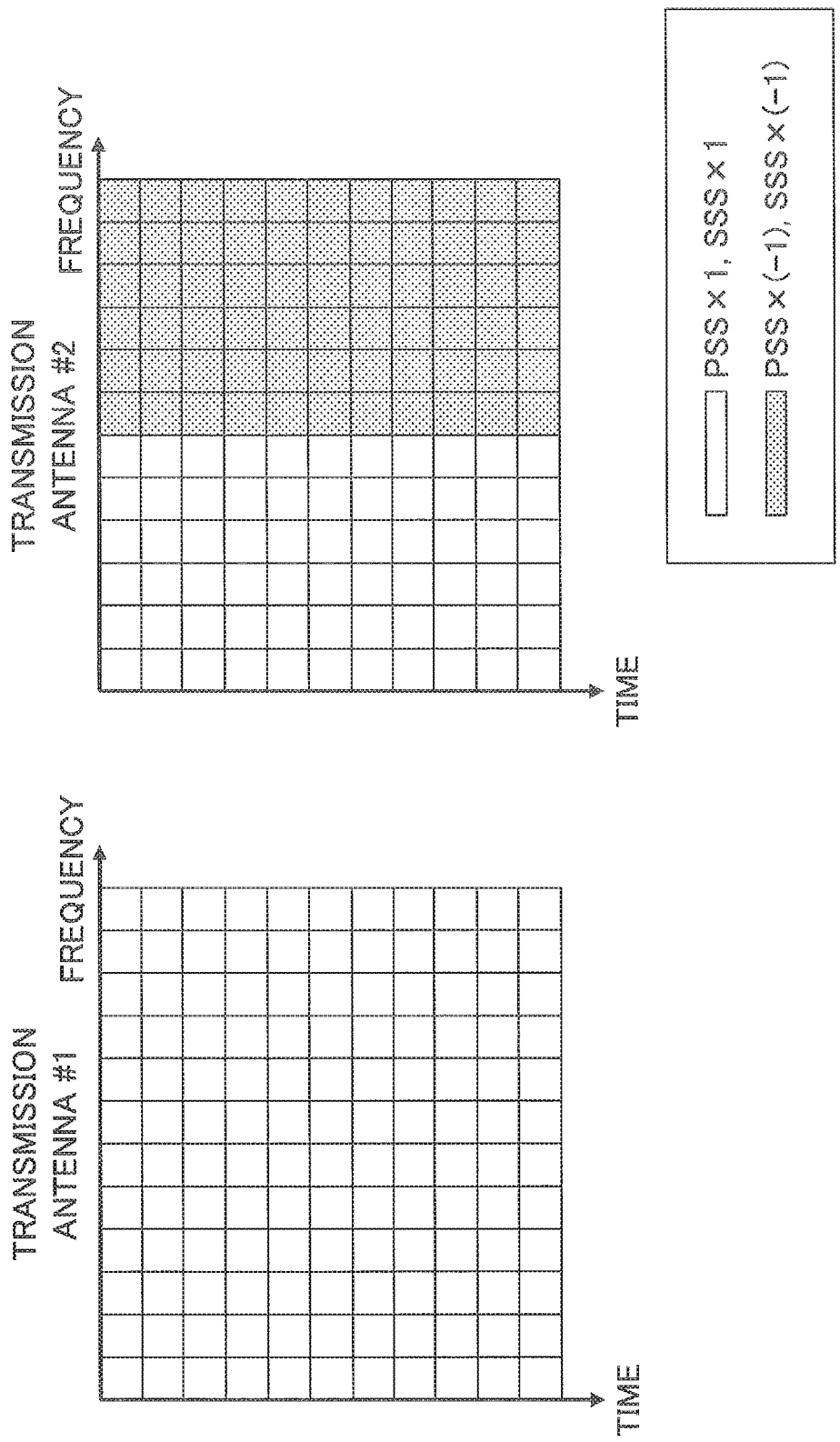
FIG. 10 is a conceptual diagram illustrating a frequency-domain PVS transmission diversity scheme (in the case of two transmission antennas and a localized scheme).
Figure 11:
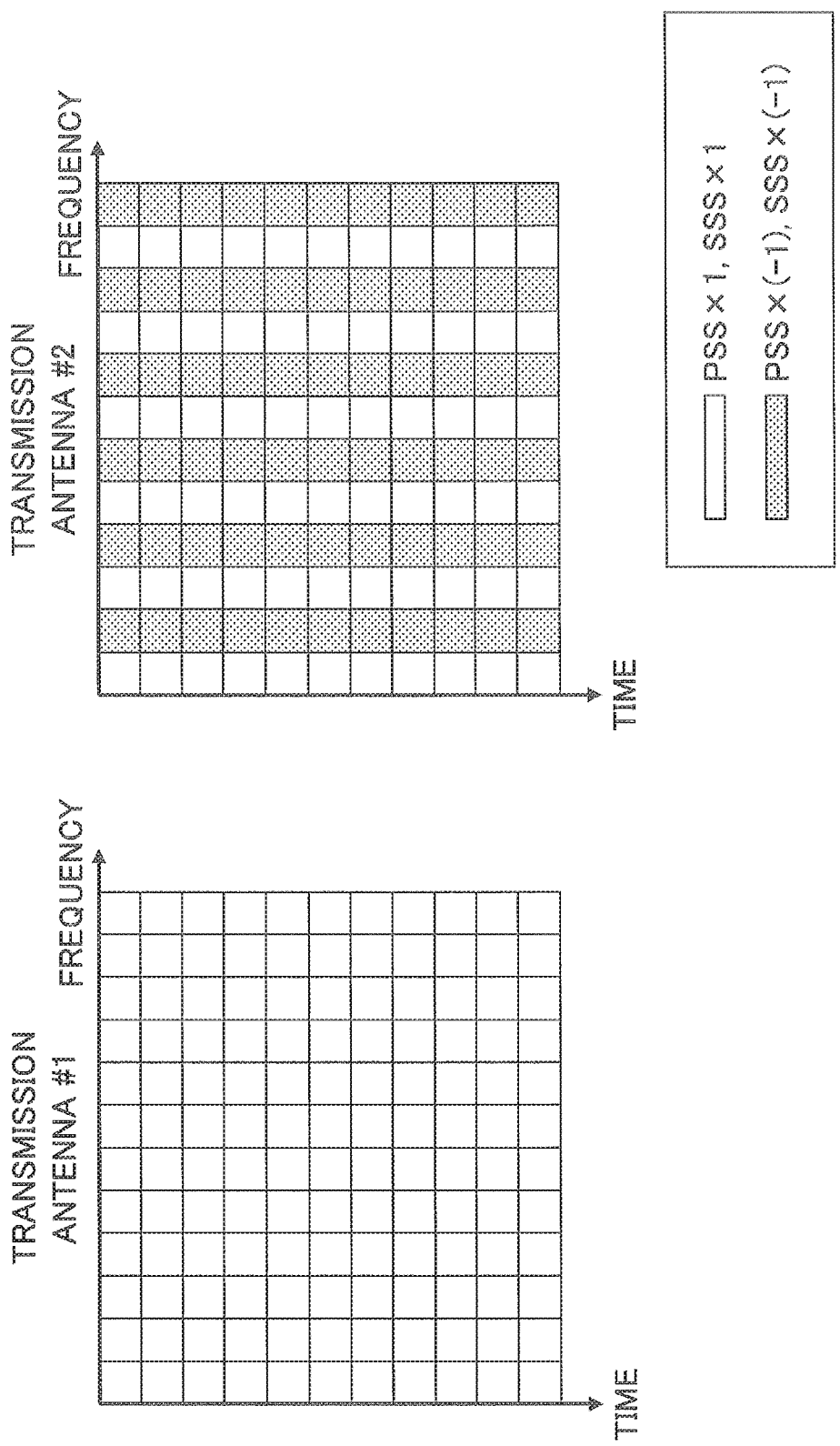
FIG. 11 is a conceptual diagram illustrating a frequency-domain PVS transmission diversity scheme (in the case of two transmission antennas and a distributed scheme).

FIGS. 10 and 11 are schematic diagrams of a frequency-domain PVS transmission diversity scheme when the base station includes two transmission antennas. FIG. 10 corresponds to an embodiment illustrating how precoding vectors are multiplied according to a localized PVS transmission diversity scheme, and FIG. 11 corresponds to an embodiment illustrating how precoding vectors are multiplied according to a distributed PVS transmission diversity scheme. According to the localized PVS transmission diversity scheme illustrated in FIG. 10, a transmission band of one resource block (RB) including twelve subcarriers is divided into two blocks, each including six consecutive subcarriers. For a transmission antenna #1, the Zadoff-Chu sequence for each block in the frequency domain is multiplied by a precoding vector {1,1}. For a transmission antenna #2, the Zadoff-Chu sequence for the second block in the frequency domain is multiplied by a precoding vector {1,-1}. The sequence multiplied by the precoding vector passes through IDFT to generate a sequence in the time domain. According to the distributed PVS transmission diversity scheme illustrated in FIG. 11, for a transmission antenna #1, the Zadoff-Chu sequence for each block in the frequency domain is multiplied by a precoding vector {1,1}. For a transmission antenna #2, the Zadoff-Chu sequence for each subcarrier is multiplied alternately by precoding vectors {1,1} and {1,-1}. For example, the Zadoff-Chu sequence in an odd-numbered subcarrier is multiplied by the precoding vector {1,1} and the Zadoff-Chu sequence in an even-numbered subcarrier is multiplied by the precoding vector {1,-1}.

The embodiments illustrated in FIGS. 10 and 11 correspond to the case where the transmission band is divided into two blocks and two transmission antennas are used. These embodiments can be broadly applied to the case where the transmission band is divided into two blocks and $N_{Tx}$ transmission antennas are used. In this case, $N_{Tx}$ different precoding vectors are generated. For a transmission antenna #1, a precoding vector #1 is used for multiplication in all the frequency blocks. For a transmission antenna #n (2<=n<=$N_{Tx}$), the precoding vector #1 is used for multiplication with a subcarrier signal in a frequency block #1, a precoding vector #n is used for multiplication with a subcarrier signal in a frequency block #2, and so on.

Figure 12:
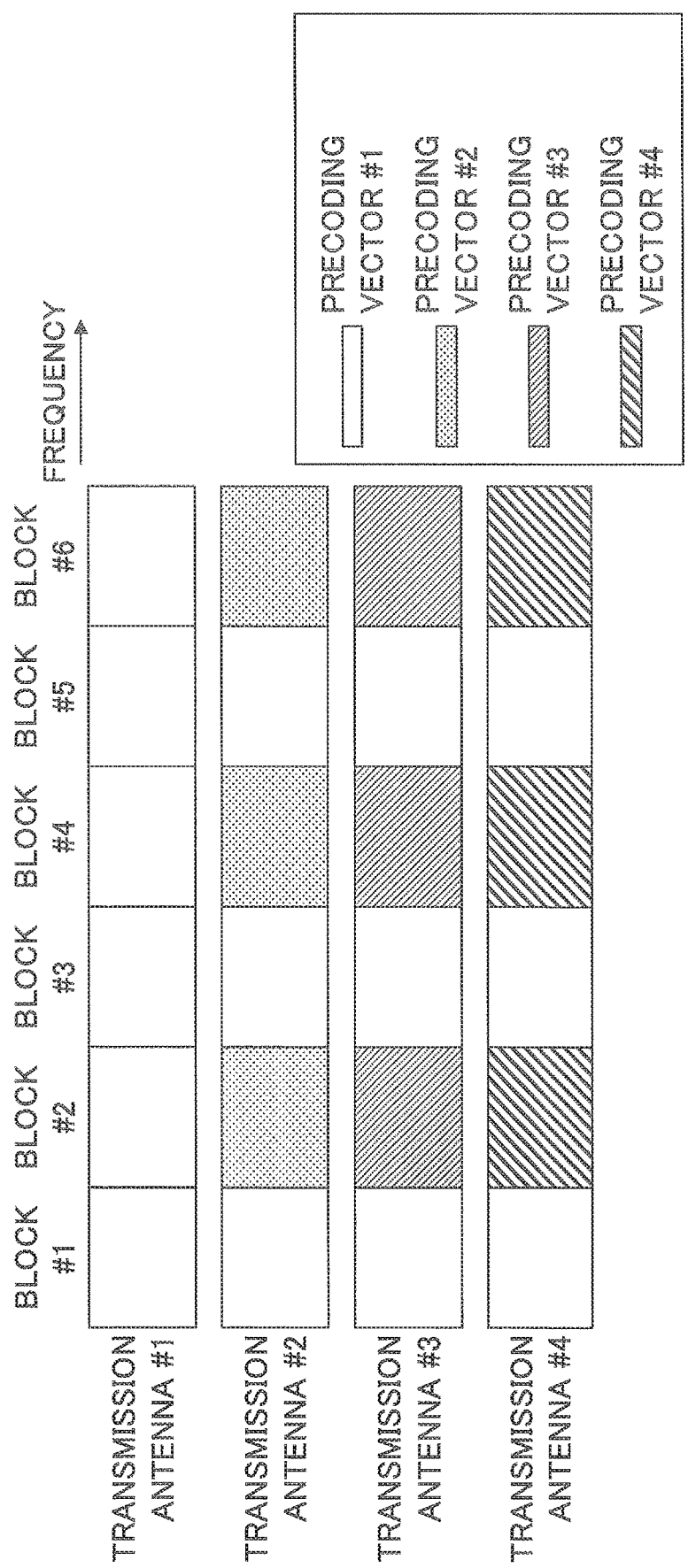
FIG. 12 is a conceptual diagram illustrating a frequency-domain PVS transmission diversity scheme (in the case of $N_{Tx}=4$ transmission antennas).

The embodiments illustrated in FIGS. 10 and 11 correspond to the case where the transmission band is divided into two blocks and two transmission antennas are used. These embodiments can be generally applied to the case where the transmission band is divided into K blocks and $N_{Tx}$ transmission antennas are used. FIG. 12 illustrates an embodiment where a localized PVS transmission diversity scheme is used in the case of $N_{Tx}$=4 transmission antennas. In this case, $N_{Tx}$ different precoding vectors are generated. It is assumed that the number of subcarriers in the frequency domain into which the synchronization signal is multiplexed is represented as $N_{Sc}^{SS}$, and the transmission band is divided into K blocks each including consecutive subcarriers into which the synchronization signal is multiplexed. K is an integer and $2<=K<=N_{Sc}^{SS}$. Typically, K is an even number. The case of $K=N_{Sc}^{SS}$ corresponds to a distributed transmission scheme. The embodiment illustrated in FIG. 12 corresponds to the case of K=6. According to this transmission scheme, for a transmission antenna #1, a precoding vector #1 is used for multiplication in all the frequency blocks. For a transmission antenna #n ($2<=n<=N_{Tx}$), the precoding vector #1 is used for multiplication with a subcarrier signal in a frequency block #(2k−1), and a precoding vector #n is used for multiplication with a subcarrier signal in a frequency block #2k ($1<=k<=N_{Sc}^{SS}/2$).

Figure 13:
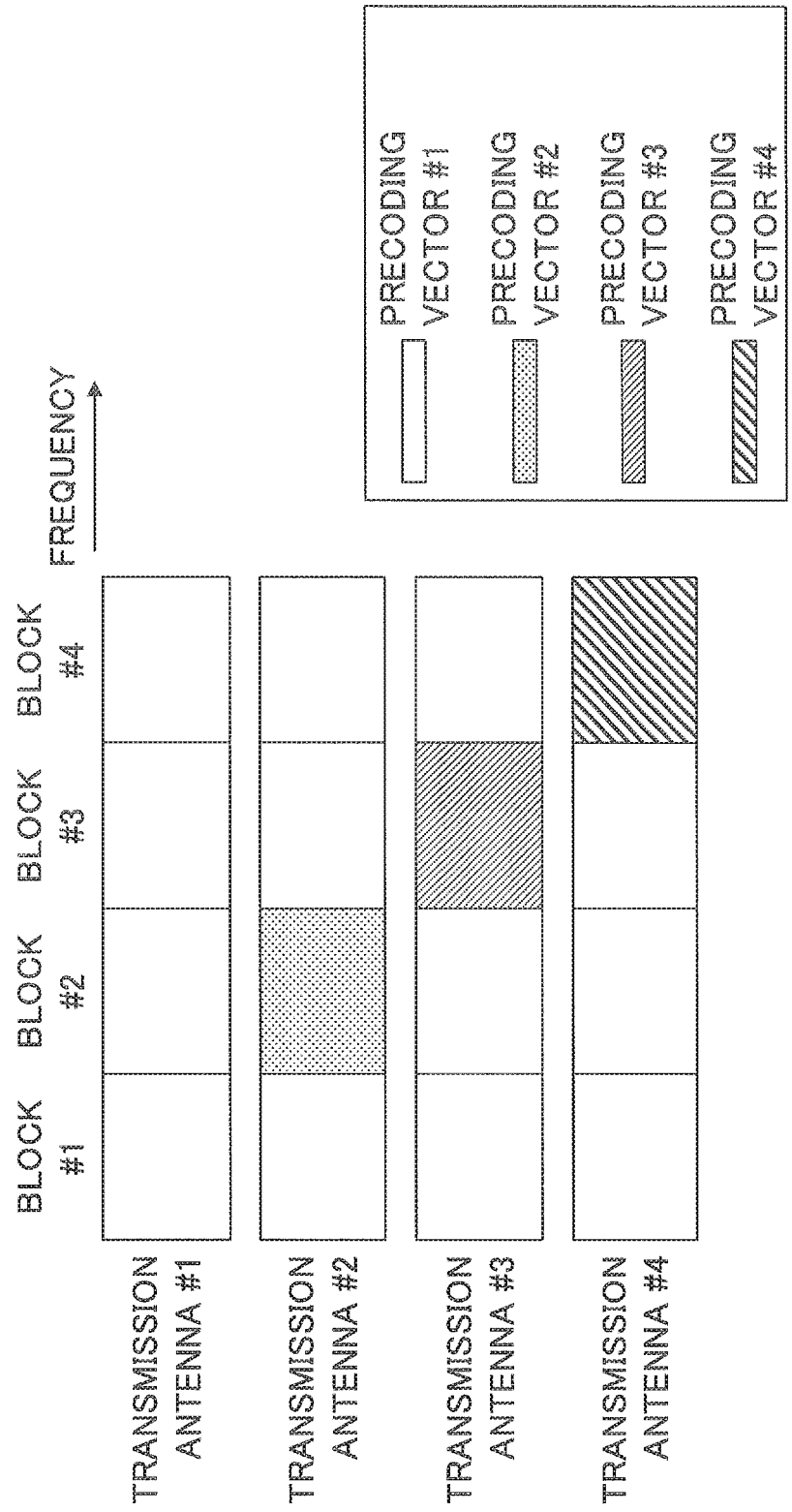
FIG. 13 is a conceptual diagram illustrating a frequency-domain PVS transmission diversity scheme (in the case of $N_{Tx}=4$ transmission antennas and one repetition).

In an embodiment illustrated in FIG. 13, the transmission band of the synchronization signal is divided into $N_{Tx}$ frequency blocks. For a transmission antenna #1, a precoding vector #1 is used for multiplication in all the frequency blocks. For a transmission antenna #n ($2<=n<=N_{Tx}$), a precoding vector #n is used for multiplication in a frequency block #n, and the precoding vector #1 is used for multiplication in the other frequency blocks. The case of $K=N_{Sc}^{SS}$ corresponds to a distributed transmission scheme.

In other words, in the case of the distributed transmission scheme, subcarriers into which the synchronization signal is multiplexed are divided into K blocks, starting from a subcarrier 1 in ascending order of a group index on a per-subcarrier basis. For a transmission antenna #1, a precoding vector #1 is used for multiplication in all the frequency blocks. For a transmission antenna #n ($2<=n<=N_{Tx}$), a precoding vector #n is used for multiplication with a subcarrier signal in a frequency block #n, and the precoding vector #1 is used for multiplication with subcarrier signals in the other frequency blocks.

Figure 14:
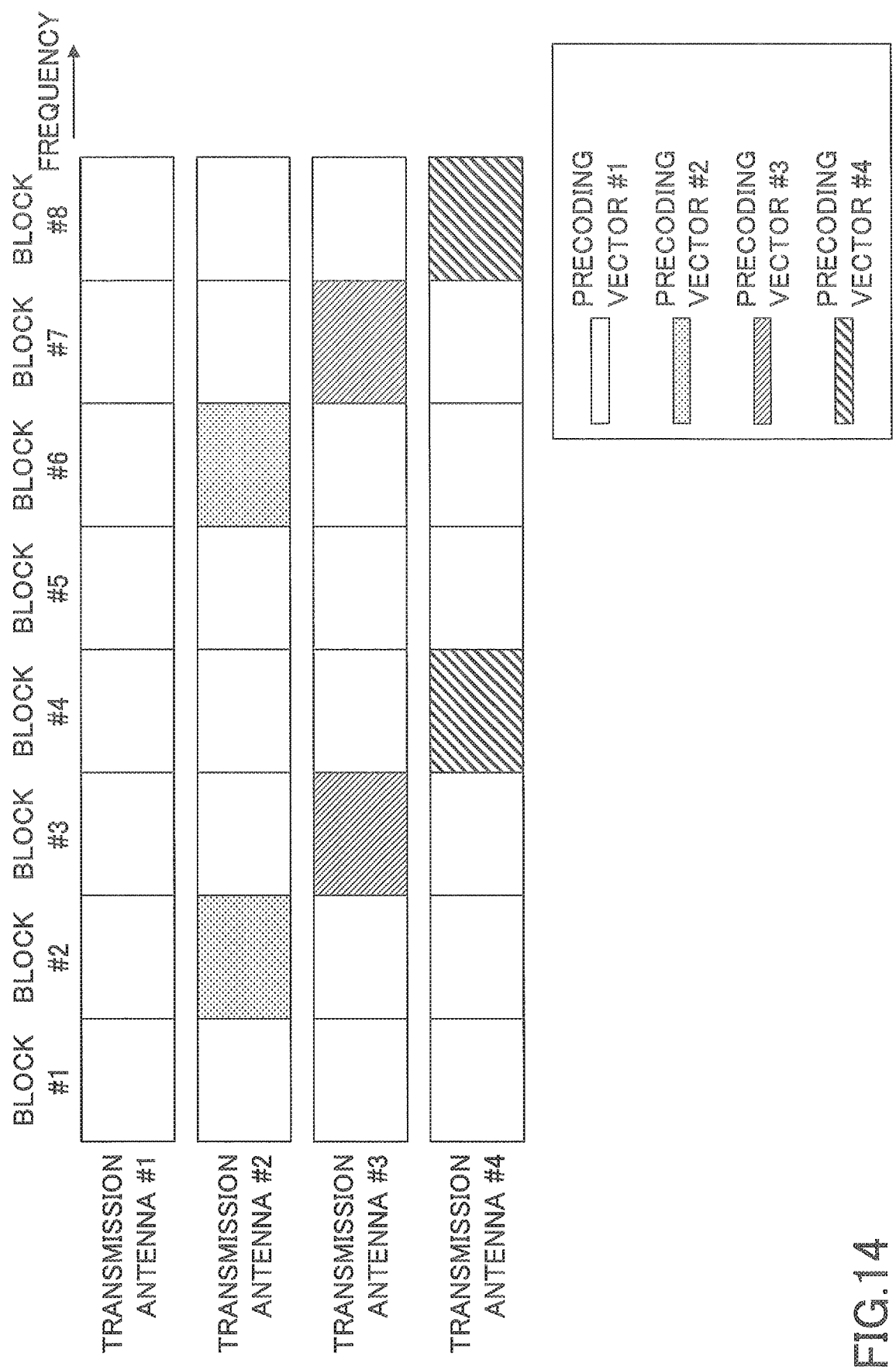
FIG. 14 is a conceptual diagram illustrating a frequency-domain PVS transmission diversity scheme (in the case of $N_{Tx}=4$ transmission antennas and multiple repetitions).

FIG. 14 illustrates an embodiment where the transmission scheme illustrated in FIG. 13 is repeated in the transmission band of the synchronization signal. The transmission band of the synchronization signal is divided into M frequency blocks (M>=2) and each of the M frequency blocks is further divided into $N_{Tx}$ frequency blocks. For a transmission antenna #1, a precoding vector #1 is used for multiplication in all the frequency blocks. For a transmission antenna #n ($2<=n<N_{Tx}$), a precoding vector #n is used for multiplication in a frequency block #n, and the precoding vector #1 is used for multiplication in the other frequency blocks. The mapping of the Zadoff-Chu sequence and the multiplication by the precoding vector are repeated M times.

<Configuration of Base Station Using Frequency-Domain Selection Transmission Diversity Scheme>

Figure 15:
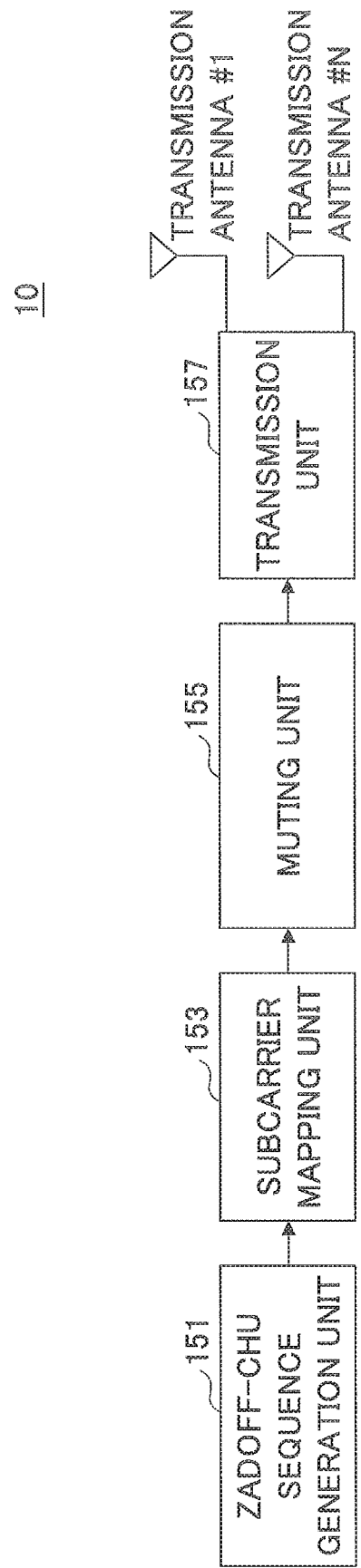
FIG. 15 is a block diagram of a base station according to another embodiment of the present invention.

FIG. 15 is a block diagram of a base station 10 according to another embodiment of the present invention. The base station 10 applies a selection transmission diversity scheme to a synchronization signal in the frequency domain and transmits the synchronization signal from N transmission antennas (N>=2), so that a UE can perform cell search. It should be noted that the diversity scheme as described below can be applied not only to a PSS but also to an SSS. The base station 10 includes a Zadoff-Chu sequence generation unit 151, a subcarrier mapping unit 153, a muting unit 155, and a transmission unit 157.

The Zadoff-Chu sequence generation unit 151 generates a Zadoff-Chu sequence that is a synchronization signal sequence to be used for the synchronization signal in the frequency domain. The Zadoff-Chu sequence generation unit 151 generates a PSS sequence that is a synchronization signal sequence to be used for a PSS and an SSS sequence that is a synchronization signal sequence to be used for an SSS.

The subcarrier mapping unit 153 divides a transmission band of the synchronization signal into N frequency blocks and maps the Zadoff-Chu sequence generated by the Zadoff-Chu sequence generation unit 151 into one or more subcarriers in the N frequency blocks. As the frequency-domain selection transmission diversity scheme where the Zadoff-Chu sequence is mapped into N frequency blocks, a localized scheme or a distributed scheme may be used. Specific examples will be described below.

The muting unit 155 mutes transmission of the synchronization signal sequence to be transmitted from an n-th antenna ($1<=n<=N$) in a frequency block other than an n-th frequency block. In other words, the synchronization signal is transmitted from the n-th antenna in the n-th frequency block.

The transmission unit 157 transmits the synchronization signal from the N transmission antennas. Specifically, the transmission unit 157 generates a Zadoff-Chu sequence in the time domain by means of IFFT. The transmission unit 157 inserts a cyclic prefix (CP) into each FFT block, generates a PSS symbol (sequence) or an SSS symbol (sequence) as the synchronization signal, and transmits it from the N transmission antennas.

Specific Examples of Frequency-Domain Selection Transmission Diversity Scheme

Figure 16:
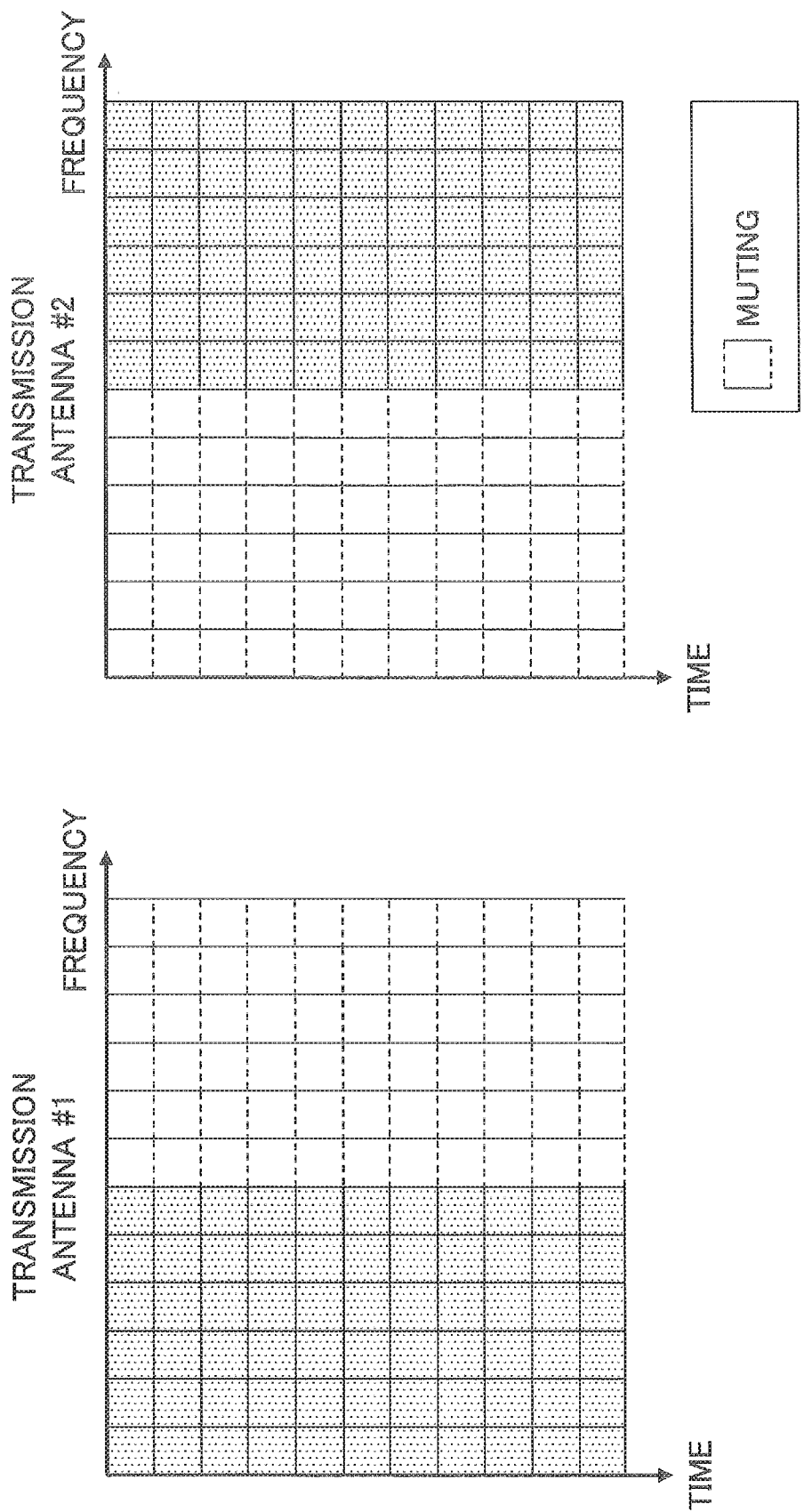
FIG. 16 is a conceptual diagram illustrating a frequency-domain selection transmission diversity scheme (in the case of two transmission antennas and a localized scheme).
Figure 17:
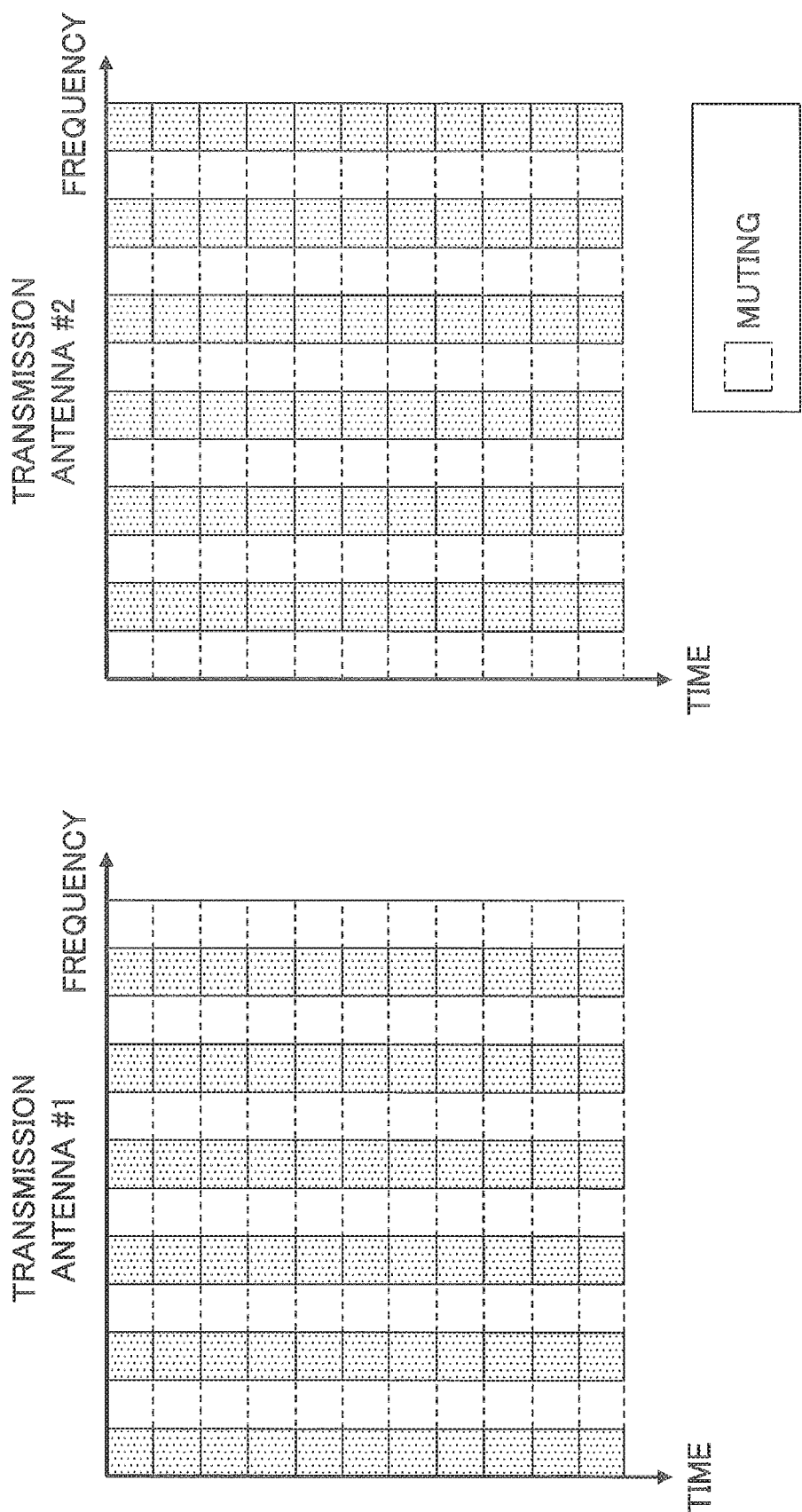
FIG. 17 is a conceptual diagram illustrating a frequency-domain selection transmission diversity scheme (in the case of two transmission antennas and a distributed scheme).

FIGS. 16 and 17 are schematic diagrams of a frequency-domain selection transmission diversity scheme when the base station includes two transmission antennas. FIG. 16 corresponds to an embodiment according to a localized selection transmission diversity scheme and FIG. 17 corresponds to an embodiment according to a distributed selection transmission diversity scheme. According to the localized selection transmission diversity scheme illustrated in FIG. 16, a transmission band of one RB including twelve subcarriers is divided into two blocks, each including six consecutive subcarriers. For a transmission antenna #1, a signal in a block #1 is transmitted, whereas signal transmission in a block #2 is muted. For a transmission antenna #2, a signal in the block 2 is transmitted, whereas signal transmission in the block #1 is muted. The waveform of the signal in the frequency domain to be transmitted from each antenna passes through IDFT to generate a sequence in the time domain. According to the distributed selection transmission diversity scheme illustrated in FIG. 17, transmission and muting of a subcarrier signal for each transmission antenna are alternately performed in the frequency domain. For example, for a transmission antenna #1, a signal in an odd-numbered subcarrier is transmitted and a signal in an even-numbered subcarrier is muted. In contrast, for a transmission antenna #2, the signal in the even-numbered subcarrier is transmitted and the signal in the odd-numbered subcarrier is muted.

In a similar manner to the frequency-domain PVS transmission diversity scheme, the embodiments according to the frequency-domain selection transmission diversity can be broadly applied to the case where the transmission band is divided into $N_{Tx}$ blocks and $N_{Tx}$ transmission antennas are used. In addition, by dividing the transmission band of the synchronization signal into M frequency blocks (M>=2) and further dividing each of the M frequency blocks into $N_{Tx}$ frequency blocks, the mapping of the Zadoff-Chu sequence and the muting can be repeated M times.

<Configuration of User Equipment Terminal>

Figure 18:
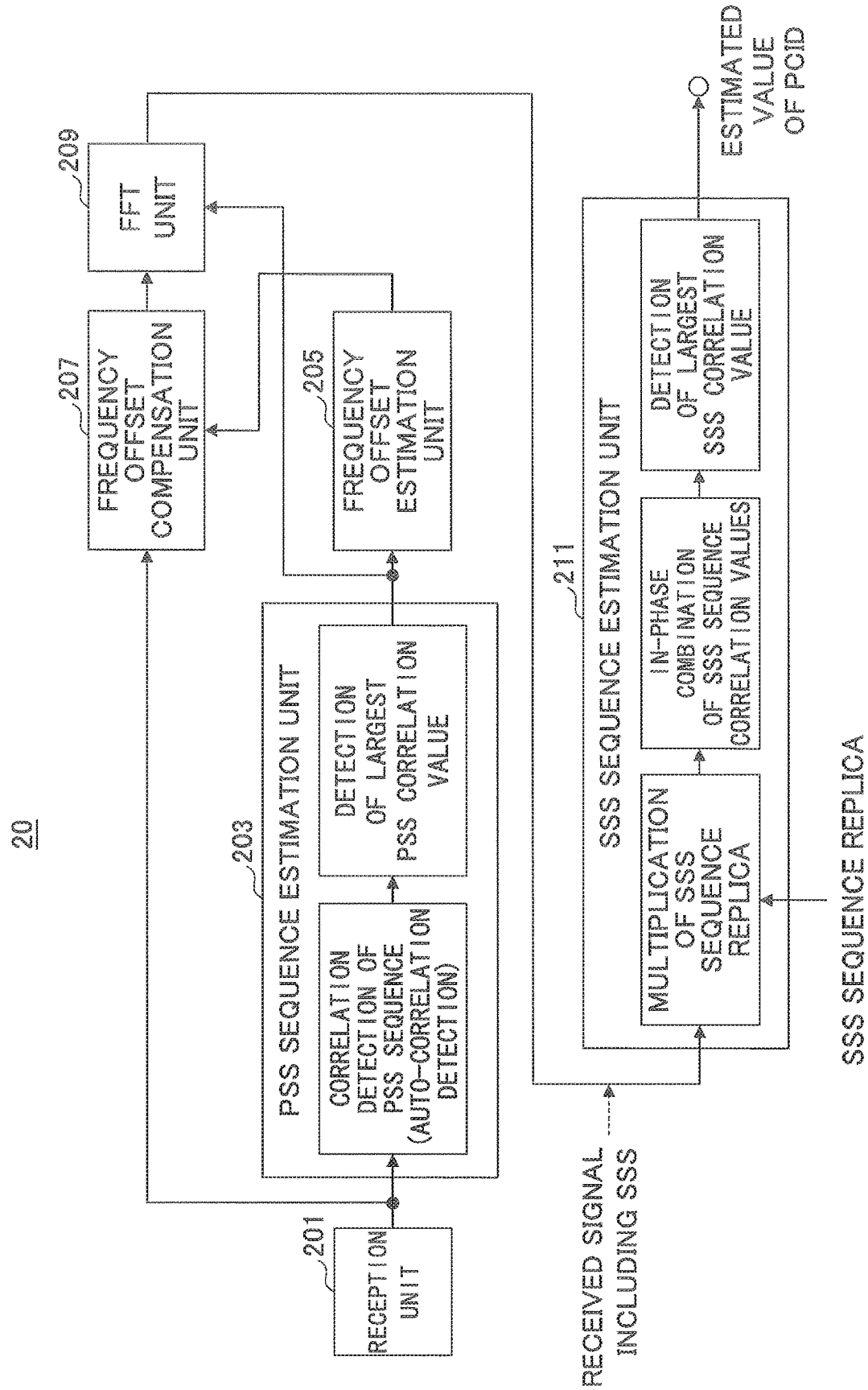
FIG. 18 is a block diagram of a user equipment terminal according to one embodiment of the present invention.
Figure 19:
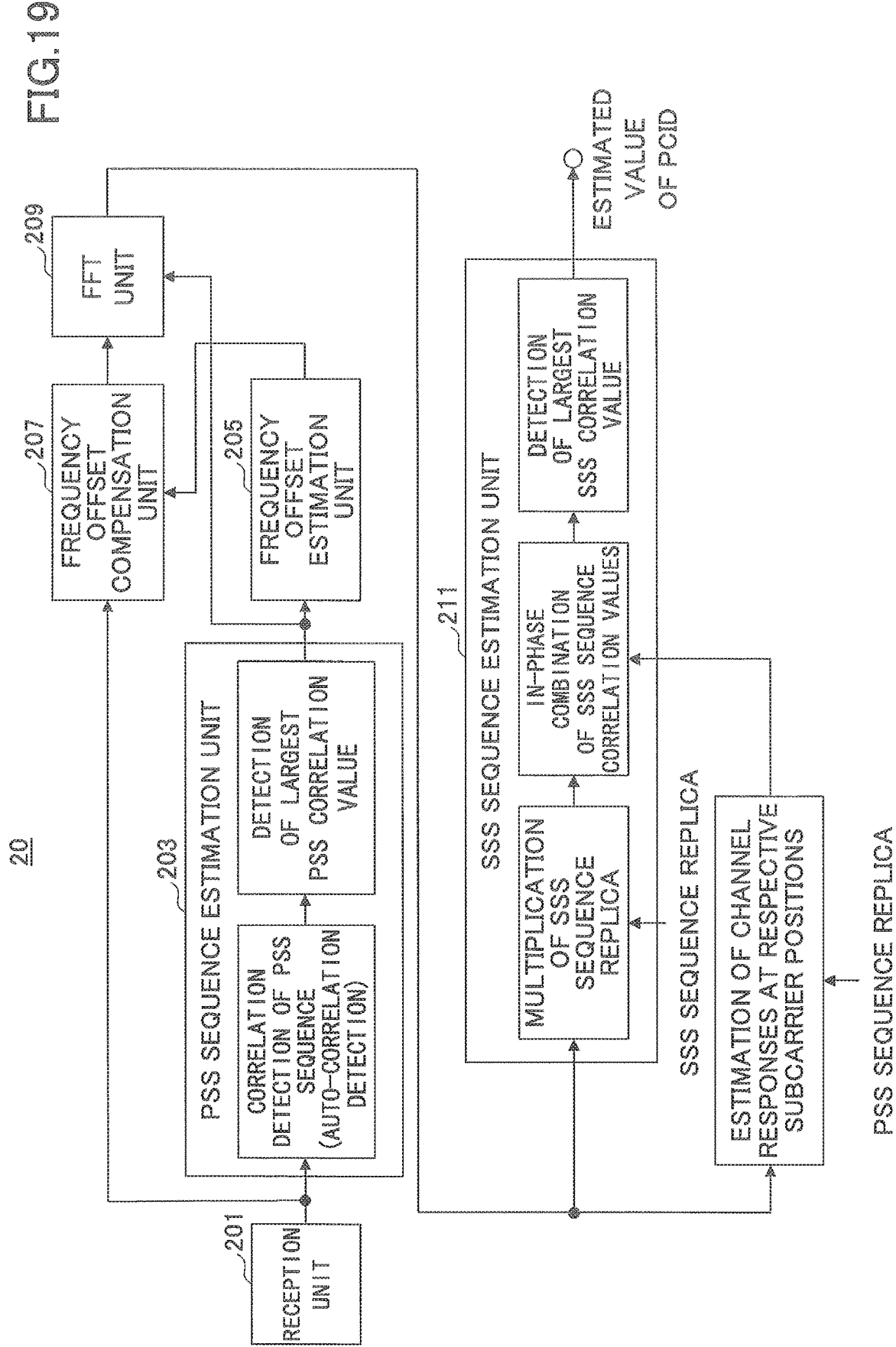
FIG. 19 is a block diagram of a user equipment terminal according to another embodiment of the present invention.

FIGS. 18 and 19 are block diagrams of a user equipment terminal 20 according to embodiments of the present invention. The user equipment terminal 20 detects a PCID based on a synchronization signal transmitted from a base station. It should be noted that the user equipment terminal 20 can detect a PCID as described below, regardless of a diversity scheme used in the base station. The user equipment terminal 20 includes a reception unit 201, a PSS sequence estimation unit 209, a frequency offset estimation unit 205, a frequency offset compensation unit 207, an FFT unit 209, and an SSS sequence estimation unit 211.

The reception unit 201 receives a PSS and an SSS from the base station.

The PSS sequence estimation unit 203 calculates autocorrelation between a PSS sequence replica and the received PSS and detects reception timing of the PSS. Specifically, the PSS sequence estimation unit 203 detects autocorrelation of the received signal including the PSS, assuming that information about the PSS sequence transmitted from the cell site (base station) is known. The reception timing of the PSS can be detected based on the maximum correlation amplitude or correlation power level of correlation amplitudes or on correlation power levels in a plurality of detected cells.

The frequency offset estimation unit 205 estimates a frequency offset based on the detected reception timing of the PSS. Specifically, the frequency offset estimation unit 205 calculates autocorrelation of the PSS based on the detected reception timing of the PSS and estimates the frequency offset.

The frequency offset compensation unit 207 compensates for the estimated frequency offset on the received signal including the PSS and the SSS.

The FFT unit 209 converts a signal waveform in the time domain (time-domain signal) to a frequency-domain signal at the timing of the maximum PSS correlation power level.

The SSS sequence estimation unit 211 calculates autocorrelation between an SSS sequence replica and the received SSS, in-phase combines correlation values in the frequency domain, and estimates a synchronization signal sequence of the SSS with the largest correlation value. Specifically, the SSS sequence estimation unit 211 calculates correlation amplitudes or correlation power levels between the SSS sequence replica and the received signal including the SSS in the frequency domain, and detects an SSS sequence with the maximum correlation amplitude or correlation power level. To estimate an SSS sequence, it is possible to use (1) a method of in-phase combining correlation values at respective subcarrier positions in the frequency domain, assuming that flat fading is feasible in the transmission band of the SSS or (2) a method of in-phase combining correlation values of the SSS at respective subcarrier positions in the frequency domain, by using frequency responses estimated using the PSS. FIG. 18 illustrates the method (1) and FIG. 19 illustrates the method (2).

Figure 1:
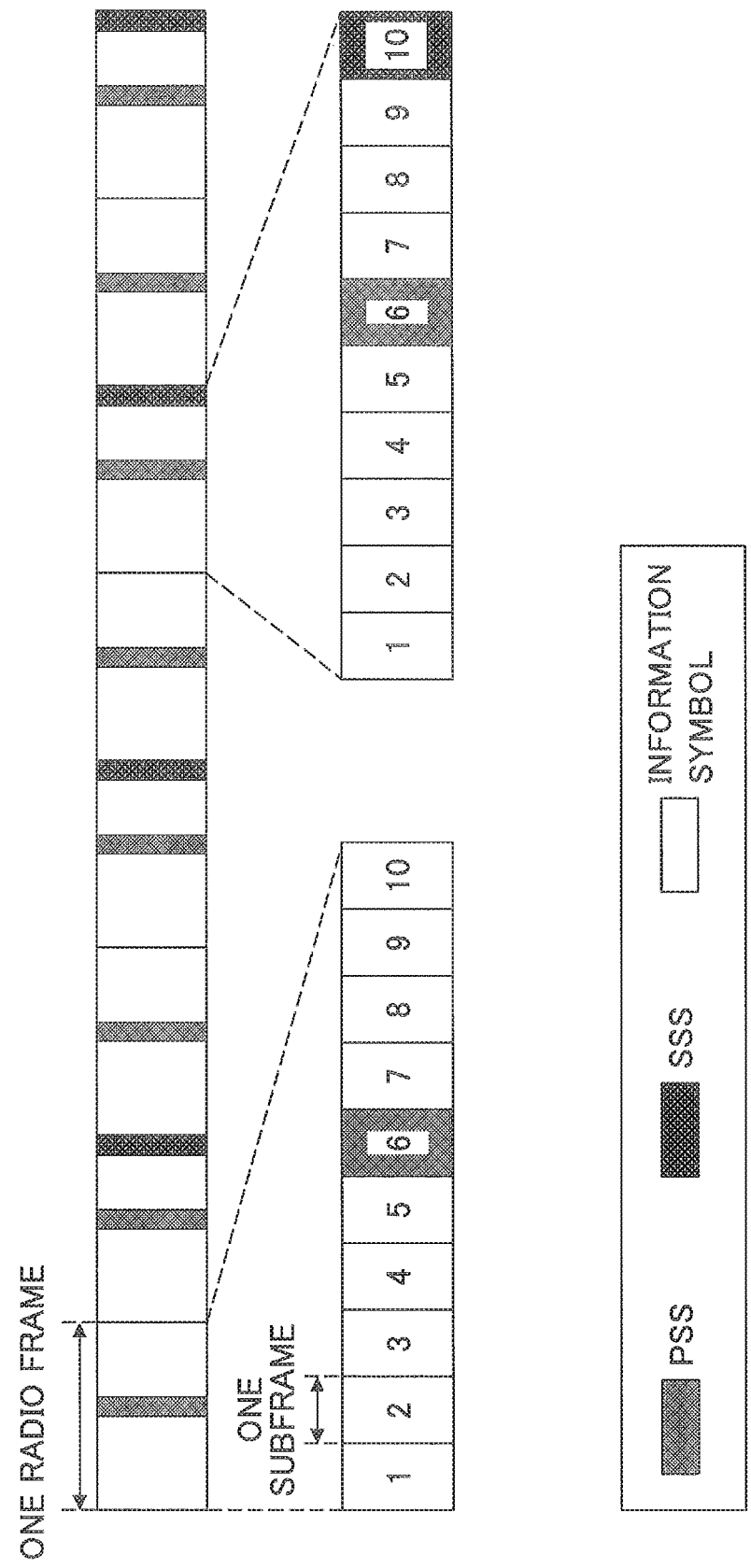
FIG. 1 is a conceptual diagram illustrating a scheme of multiplexing a PSS and an SSS in a radio frame in NB-IoT.
Figure 2:
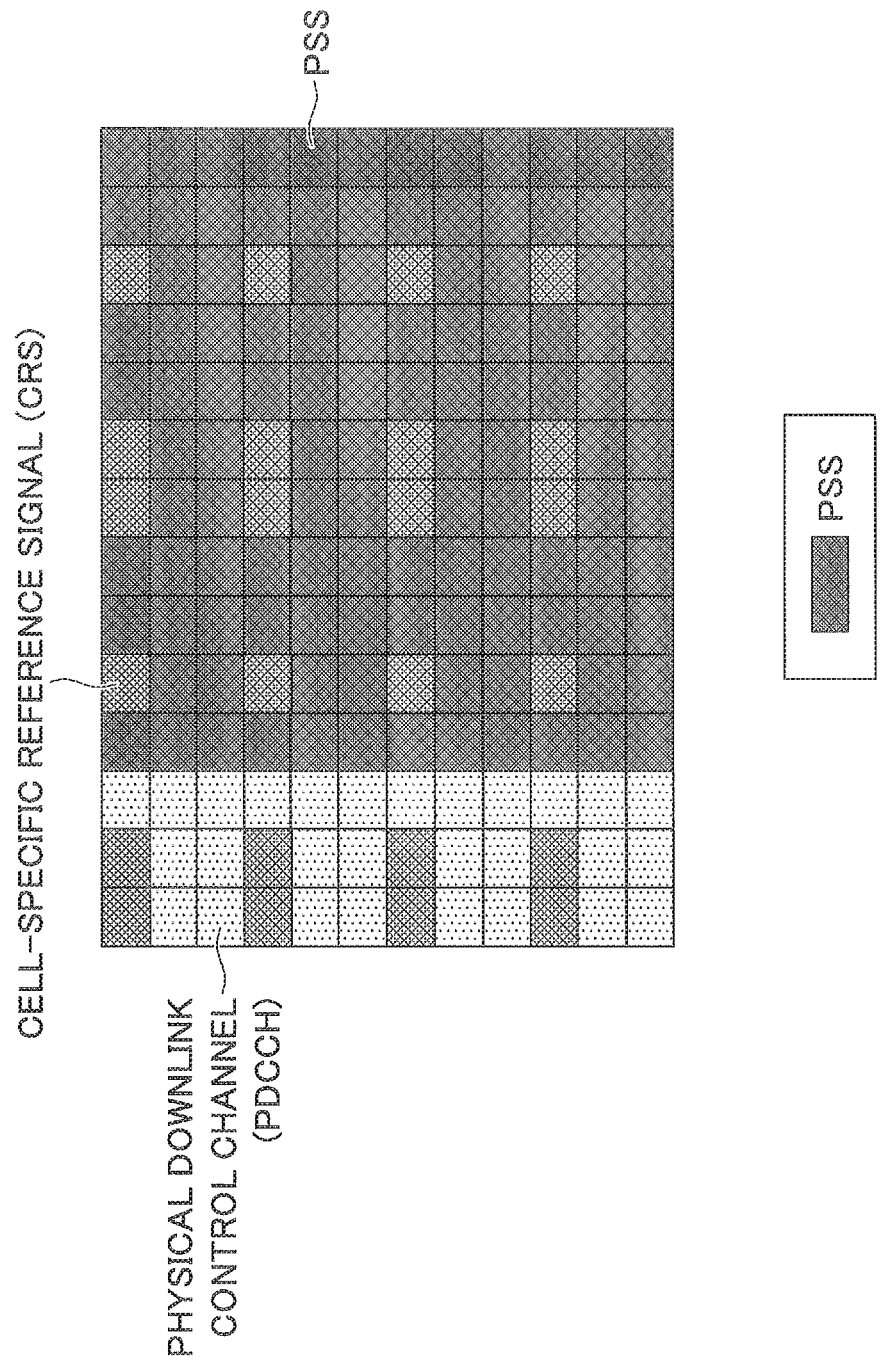
FIG. 2 is a conceptual diagram illustrating a scheme of multiplexing a PSS in a subframe in NB-IoT.
Figure 3:
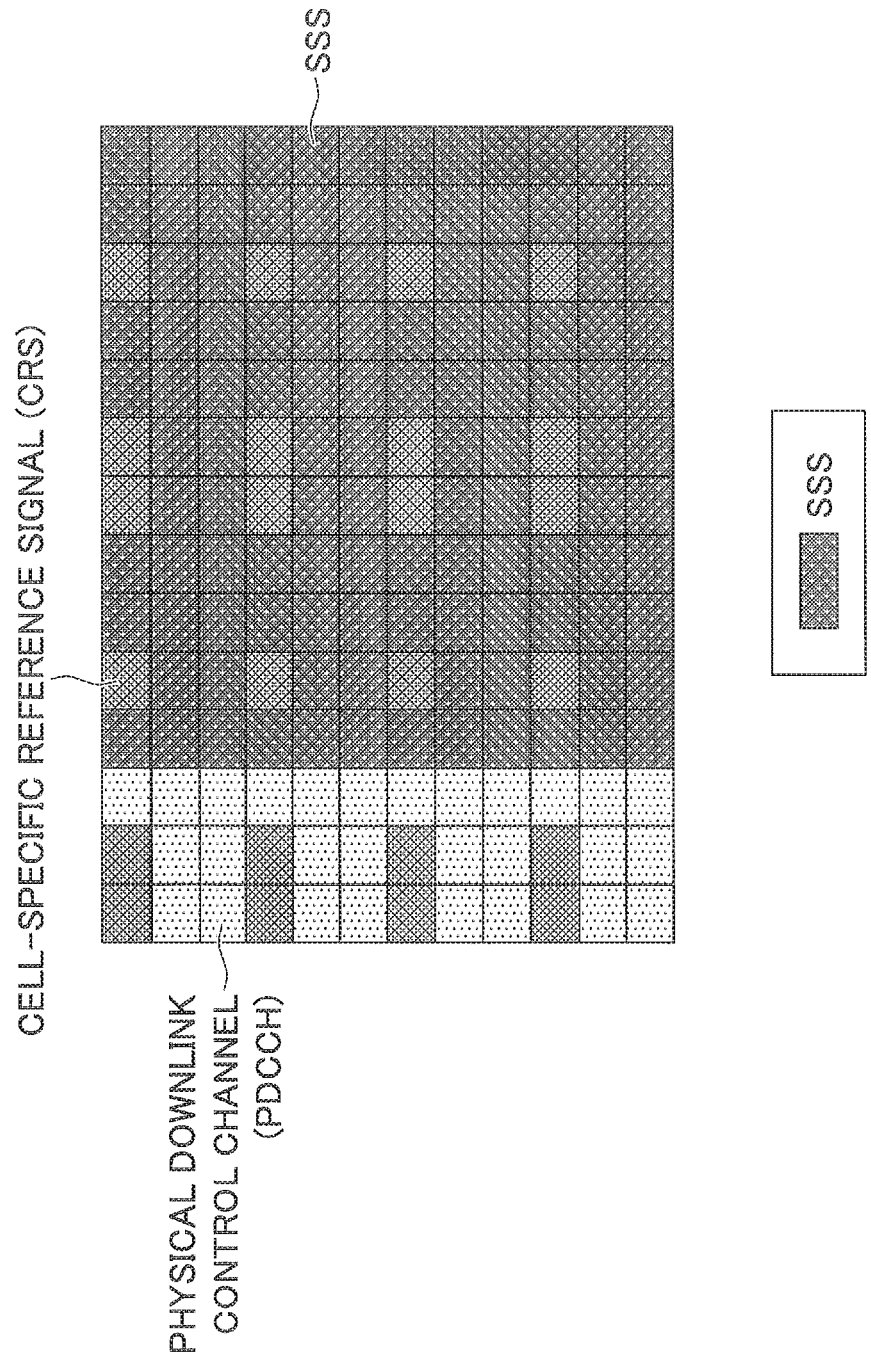
FIG. 3 is a conceptual diagram illustrating a scheme of multiplexing an SSS in a subframe in NB-IoT.
Figure 4:
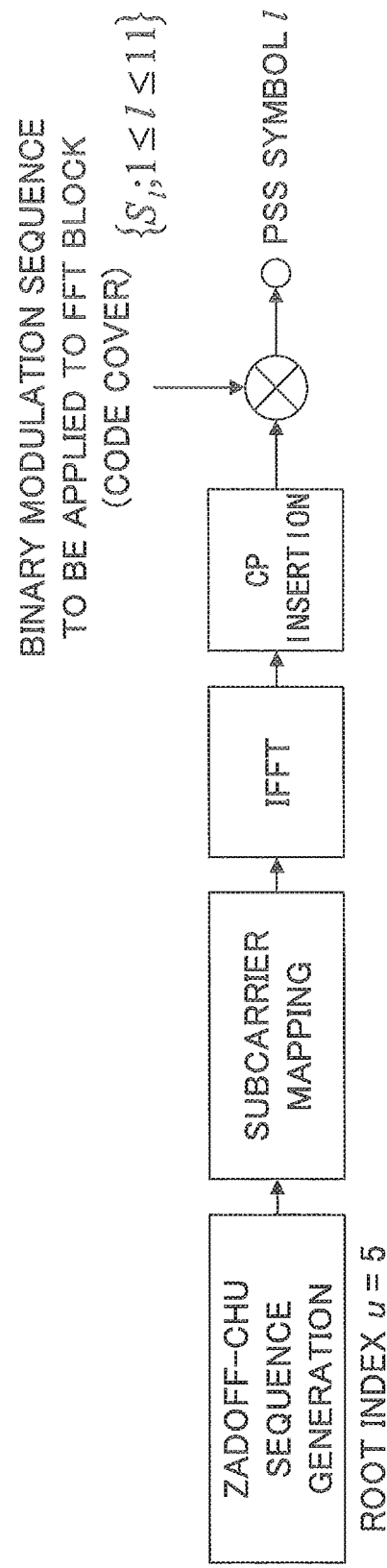
FIG. 4 is a conceptual diagram illustrating a scheme of generating a PSS symbol (sequence) in NB-IoT.
Figure 5:
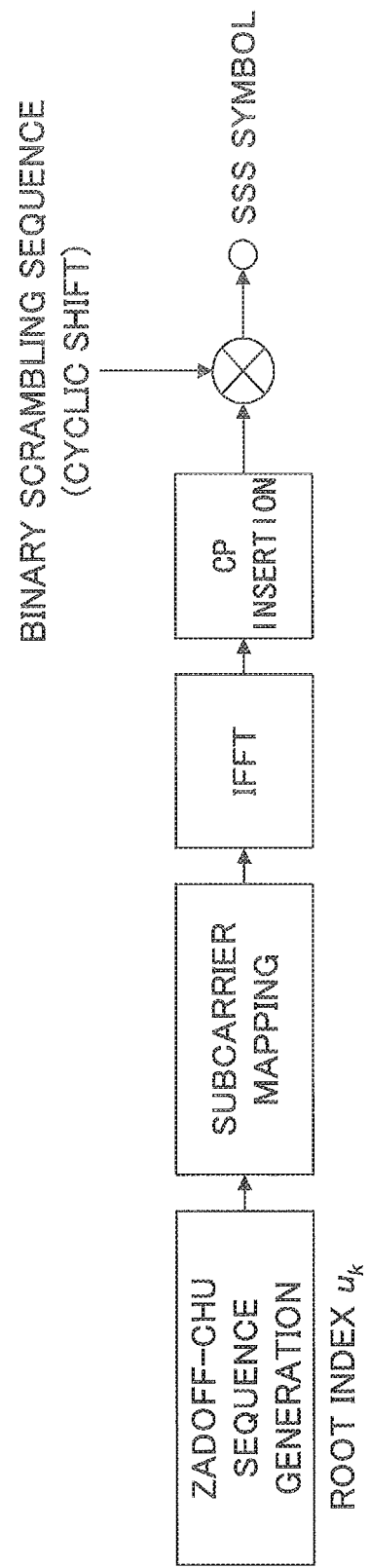
FIG. 5 is a conceptual diagram illustrating a scheme of generating a SSS symbol (sequence) in NB-IoT.
Figure 6:
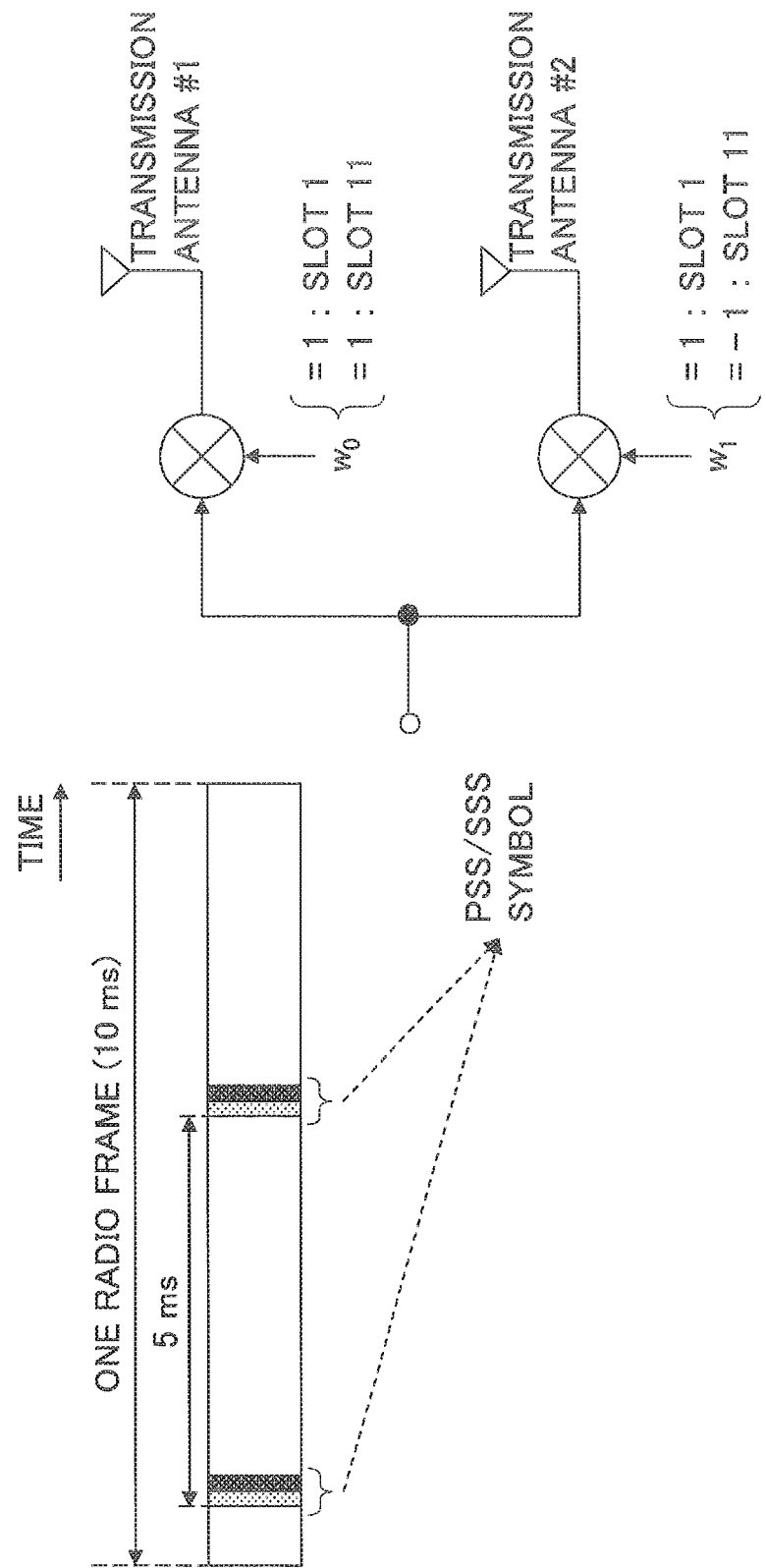
FIG. 6 is a conceptual diagram illustrating a PVS transmission diversity scheme applied to a PSS and an SSS in LTE.
Figure 7:
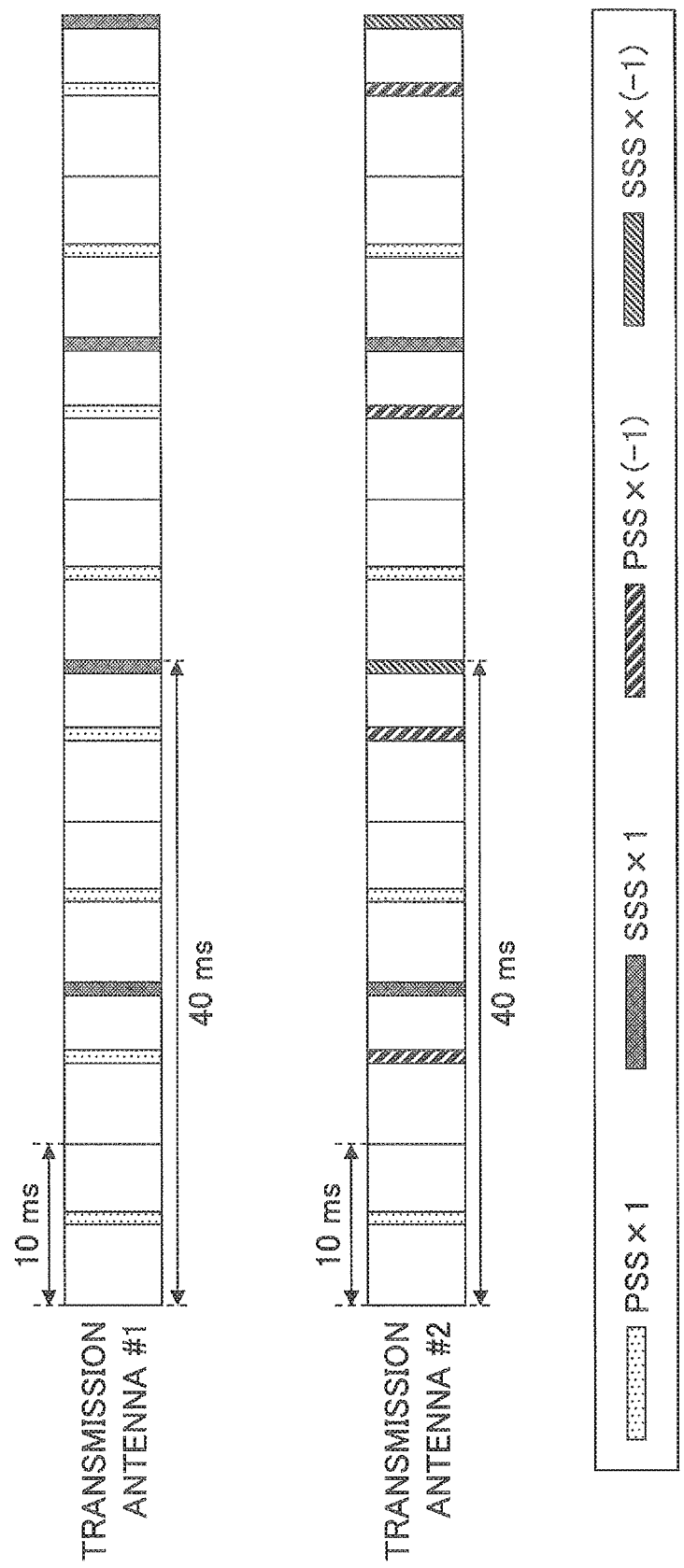
FIG. 7 is a conceptual diagram illustrating a time-domain PVS transmission diversity scheme applied to a PSS and an SSS in NB-IoT.

The method (1) can be applied to the time-domain PVS transmission diversity illustrated in FIG. 7. As described with reference to FIG. 7, the PSS multiplexed at the time intervals of 10 ms is multiplied alternately by the precoding vectors {1,1} and {1,−1}, for example. The SSS multiplexed at the time intervals of 20 ms is also multiplied alternately by the precoding vectors {1,1} and {1,−1}, for example. From the viewpoint of the SSS, the PSS multiplexed into the same radio frame is multiplied alternately by the same precoding vector and a different precoding vector. Since the user equipment terminal cannot detect the precoding vector of the PSS, the user equipment terminal cannot in-phase combine correlation values of the SSS sequence by using the frequency responses estimated using the PSS. Thus, assuming that channel fluctuations in the frequency domain are substantially negligible, that is, assuming that frequency flat fading is feasible, in-phase components and quadrature components are respectively combined. The SSS sequence estimation unit 211 independently averages in-phase components and quadrature components of a signal generated by multiplying the received signal including the SSS in the frequency domain by a complex conjugate of the SSS sequence, calculates a correlation power level based on either or both of the average in-phase component and the average quadrature component, and then estimates the SSS sequence.

The method (2) can be applied to the frequency-domain PVS transmission diversity or the frequency-domain selection transmission diversity illustrated in any of FIGS. 10-17. As described with reference to FIGS. 10-17, the PSS and the SSS multiplexed into the same subcarrier in the same radio frame are multiplied by the same precoding vector. Thus, by using the channel responses estimated using the PSS at the respective subcarrier positions, correlation values of the SSS can be in-phase combined in the frequency domain. The SSS sequence estimation unit 211 calculates correlation power levels sequentially using one of a plurality of predetermined SSS sequence candidates, and detects a SSS sequence with the maximum correlation power level.

Specific Example of Detecting PSS Reception Timing and Radio Frame Timing

It is assumed that a frequency offset of 20 ppm is used according to NB-IoT simulation requirements. To detect correlation of a PSS in LTE, cross-correlation between a received signal including the PSS and a PSS sequence replica in the time domain is calculated. To simplify the description, it is assumed that oversampling is not used and a sampling frequency is equal to a chip rate of a Zadoff-Chu sequence.

Based on timing when an auto-correlation value of the PSS is largest, FFT block timing, PSS reception timing, subframe timing, and radio frame timing can be detected. Since the PSS is multiplexed within eleven FFT blocks, a vector $\gamma(\tau)$, as expressed in the following equation, is defined as a sample value signal of the received signal within the interval of the eleven FFT blocks starting from a sampling time $\tau$.

$$\gamma(\tau)=[R_1 R_2 \ldots R_{11}] \quad (5)$$

In the equation (5), $R_l(l=1, 2, \ldots, 11)$ represents a received signal with the length of an FFT block corresponding to the PSS spread with the same Zadoff-Chu sequence.

In the receiver, auto-correlation of the received signal is calculated with delay of k FFT block intervals ($1<=k<11$), as expressed in the following equation.

$$A_k(\tau) = \frac{1}{11-k} \sum_{l=1}^{11-k} s(l)s(l+k)R_{l+1}R_l^H \quad (6)$$

In the equation (6), s(l) represents a modulation component of the PSS in an l-th FFT block, and $^H$ is Hermitian transpose. For example, in the case of k=1, s(l) represents auto-correlation of the received signal with delay of one FFT block interval. If a correct reception timing of the PSS is represented as $\tau_0$ and the amount of phase rotation in one FFT block interval caused by a frequency offset is represented as θ, $E[A_k(\tau_0)] \propto e^{jk\theta}$ is satisfied. In order to reduce an effect of the frequency offset, a cost function as expressed in the following equation is defined (see Non-Patent Document 3).

$$\rho_m(\tau) = A_1(\tau) + w_1 A_1^*(\tau) A_2(\tau) + w_2 A_2^*(\tau) A_3(\tau) + w_3 A_3^*(\tau) A_4(\tau) \tag{7}$$

In the equation (7), since the frequency offset increases with increase in the value of k in $A_k(\tau)$, an error in a correlation peak position increases accordingly. Thus, as expressed in the equation (7), the respective correlation values are combined with weights in order to reduce the effect of the frequency offset. Weight factors are determined so as to maximize the detection probability of the PSS. In Non-Patent Document 3, $w_1=0.76$, $w_2=0.54$, and $w_3=0.34$ are used. When the UE moves at a low speed or is stationary, the maximum Doppler frequency is low and channel fluctuations in the time domain are very small. Thus, by in-phase combining the result of the cost function over a plurality of PSSs multiplexed at the time intervals of 10 ms, an effect of noise can be reduced.

$$\hat{\tau} = \max_{\tau \in (0,T]} \left\{ \left| \sum_{m=1}^{N} \text{Re}[\rho_m(\tau)] \right|^2 + \left| \sum_{m=1}^{N} \text{Im}[\rho_m(\tau)] \right|^2 \right\} \tag{8}$$

Specific Example of Estimating Frequency Offset

Since the cost function $\rho_m(\tau)$ represents the amount of phase rotation caused by a frequency offset in one FFT block interval including a CP, the frequency offset can be expressed in the following equation.

$$\Delta \hat{f} = \frac{f_s}{2\pi(N_{CP} + N_{FFT})} \arg\max [\rho(\hat{\tau})] = \frac{N_{FFT} f_{SC}}{2\pi(N_{CP} + N_{FFT})} \arg\max [\rho(\hat{\tau})] \tag{9}$$

In the equation (9), $-\pi < \arg[\rho(\hat{\tau})] < \pi$. $f_s$ is a sampling frequency, $f_{SC}$ is subcarrier spacing, $N_{FFT}$ is the number of samples in an effective symbol interval (FFT block interval), and $N_{CP}$ is the number of samples in a CP interval. In the case of $f_s=7.67$ MHz, $f_{SC}=15$ kHz, $N_{FFT}=512$, and $N_{CP}=36$, the frequency offset can be expressed in the following equation.

$$\Delta \hat{f} = \frac{7.68 \times 10^6}{2\pi(36 + 512)} \arg\max [\rho(\hat{\tau})] = \frac{64}{137\pi} \arg\max[\rho(\hat{\tau})] \times 15 \text{ kHz} \tag{10}$$

According to the equations (9) and (10), a phase within the range of $-\pi < \arg[\rho(\hat{\tau})] < \pi$ can be detected. However, when the frequency offset is high, $\arg[\rho(\hat{\tau})]$ may exceed $2\pi$. Thus, the detection range of the frequency offset is extended as expressed in the following equation.

$$\Delta \tilde{f} = \max_{\hat{\tau},G} \left\{ \frac{f_s}{2\pi(N_{CP} + N_{FFT})} (\arg[\rho(\hat{\tau})] + 2\pi G) \right\} = \max_{\hat{\tau},G} \left\{ \left[ \frac{\arg[\rho(\hat{\tau})]}{2\pi} + G \right] \frac{N_{FFT}}{(N_{CP} + N_{FFT})} f_{SC} \right\} \tag{11}$$

In the equation (11), the values of $\arg[\rho(\hat{\tau})]$ and G are detected according to maximum likelihood. The value of G is set within $G \in \{0, \pm 1, \pm 2\}$, for example, depending on the frequency offset value.

Specific Example of Estimating SSS Sequence

By detecting an SSS sequence, a PCID can be detected. After compensating for the frequency offset value estimated according to the equation (11) on the received signal, the received signal including the SSS is converted to a frequency-domain signal by means of FFT, using the FFT block timing and the subframe timing estimated using the PSS. As described above, to estimate an SSS sequence, it is possible to use (1) a method of in-phase combining correlation values in the frequency domain, assuming that flat fading is feasible in the transmission band of the SSS or (2) a method of in-phase combining correlation values of the SSS at respective subcarrier positions in the frequency domain, by using frequency responses estimated using the PSS. First, the method (2) is described below.

If a subcarrier index is represented as n (n=1, 2, ..., 11), channel responses at respective subcarrier positions are derived from the received signal including the PSS in the frequency domain according to the following equation. Only a PSS multiplexed in the same subframe as the SSS is used to estimate the channel responses of the SSS. The estimated value of the channel response in a subcarrier #n in a radio frame v is expressed in the following equation.

$$\xi_v(n) = \sum_{l=1}^{11} S(l) R_v^{PSS}(n) d_l^{PSS}(n)^* \tag{12}$$

In the equation (12), it is assumed that v representing a radio frame index is equal to zero (v=0) at a radio frame from which the correlation detection of the SSS sequence starts. It is also assumed that a PCID index is represented as l (0<=l<504), which is determined by a combination of a root index of one hundred twenty-six Zadoff-Chu sequences and one of four scrambling sequences. An index of a cyclic shift pattern of the scrambling sequences is represented as c (0<=c<4). l and c are detected according to the following equation.

$$(\hat{l}, \hat{c}, \hat{v}) = \max_{l,c,v \in \{0,1\}} \left\{ \text{Re} \left[ \sum_{\lambda=0,2} \sum_{k=1}^{11} \sum_{n=1}^{12} R_{v+\lambda,k}^{SSS}(n) \xi_{v+\lambda}(n)^* d_k^{SSS(l,(c+\lambda/2) \bmod 4)}(n)^* \right] \right\} \tag{13}$$

In the equation (13), it is uncertain whether the SSS is multiplexed into the radio frame from which correlation detection of the SSS sequence starts. Thus, the correlation detection of the SSS sequence is performed during consecutive radio frames at timing when the SSS is multiplexed (v ∈ {0,1}), and it is determined that the SSS is multiplexed into a radio frame with a larger correlation value.

The method (1) is a method of in-phase combining correlation values of the SSS sequence at respective subcarrier positions in the frequency domain, assuming that flat fading is feasible due to a narrow NB-IoT transmission band, as described above. In-phase components and quadrature components are derived according to the following equation, assuming that the channel responses in the frequency domain are constant.

$$(\hat{l}, \hat{c}, \hat{v}) = \max_{l,c,v \in \{0,1\}} \left\{ \sum_{\lambda=0,2} \left| \text{Re} \left[ \sum_{k=1}^{11} \sum_{n=1}^{12} R_{v+\lambda,k}^{SSS}(n) d_k^{SSS(l,(c+\lambda/2) \bmod 4)}(n)^* \right] \right|^2 + \sum_{\lambda=0,2} \left| \text{Im} \left[ \sum_{k=1}^{11} \sum_{n=1}^{12} R_{v+\lambda,k}^{SSS}(n) d_k^{SSS(l,(c+\lambda/2) \bmod 4)}(n)^* \right] \right|^2 \right\} \quad (14)$$

Figure 20:
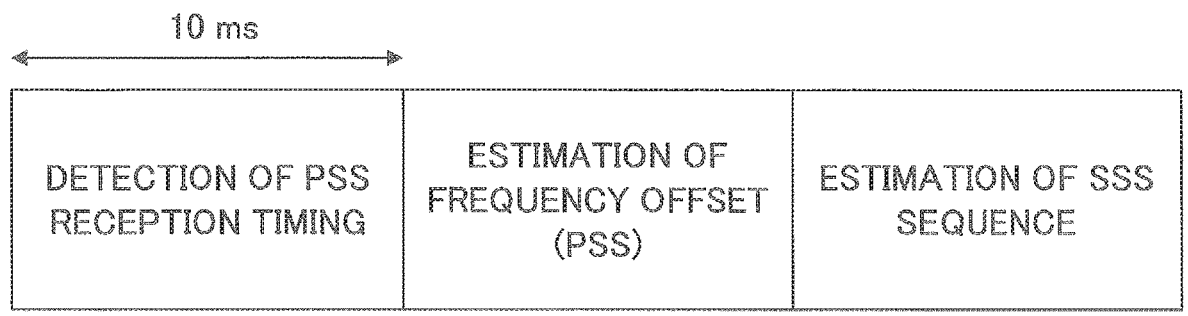
FIG. 20 is a time schedule for detection of a PCID when a frequency-domain PVS transmission diversity scheme is used.

FIG. 20 illustrates a time schedule for detection of a PCID when the frequency-domain PVS transmission diversity scheme is used. This time schedule is a time schedule in one repetition loop. When the PCID cannot be detected, the schedule illustrated in FIG. 20 is repeated. By detecting auto-correlation of the received signal with the length of 10 ms, PSS reception timing, FFT block timing, subframe timing, and radio frame timing are detected. According to the frequency-domain PVS transmission diversity scheme in the embodiment of the present invention, a PVS diversity effect can be achieved by auto-correlation in one subframe interval. Using the detected PSS reception timing, a frequency offset is estimated using the PSS in a next time interval of 10 ms. After compensating for the estimated frequency offset on the received signal, correlation detection of the SSS sequence is performed. Specifically, a combination of a root index of a Zadoff-Chu sequence and a scrambling sequence, which forms one of five hundred and four PCIDs, is detected. Since the SSS is multiplexed at the time intervals of 20 ms, cross-correlation of the SSS with the length of 20 ms needs to be performed. By performing correlation detection according to these processes during integral multiples of the time interval of 10 ms, although a processing time in one repetition loop may be increased, an effect of noise can be reduced by averaging the correlation values.

Effects of Embodiments of the Present Invention

According to an embodiment of the present invention, it is possible to fundamentally shorten time to detect a PCID, compared to the time-domain PVS transmission diversity scheme.

According to a PVS transmission diversity scheme applied to a PSS and an SSS in LTE and a PVS transmission diversity scheme applied to a PSS and an SSS in NB-IoT as described in Non-Patent Document 3, a space diversity effect can be achieved, by multiplying a plurality of PSSs or SSSs by different precoding vectors in the time domain and combining correlation values of the plurality of PSSs or SSSs. On the other hand, according to a frequency-domain PVS transmission diversity scheme in an embodiment of the present invention, a space diversity effect can be achieved, by dividing a PSS and an SSS multiplexed into one radio frame of 10 ms, or more specifically multiplexed into one subframe, into a plurality of blocks in the frequency domain, and multiplying them by different precoding vectors in the different frequency blocks. For this reason, in an NB-IoT system where a PVS transmission diversity scheme or a selection transmission diversity scheme is employed, it is possible to shorten time to detect a PCID, and in other words, it is possible to quickly detect the PCID. By shortening time to detect the PCID, power consumption of a user equipment terminal such as a sensor can be reduced.

<Hardware Configuration>

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 21:
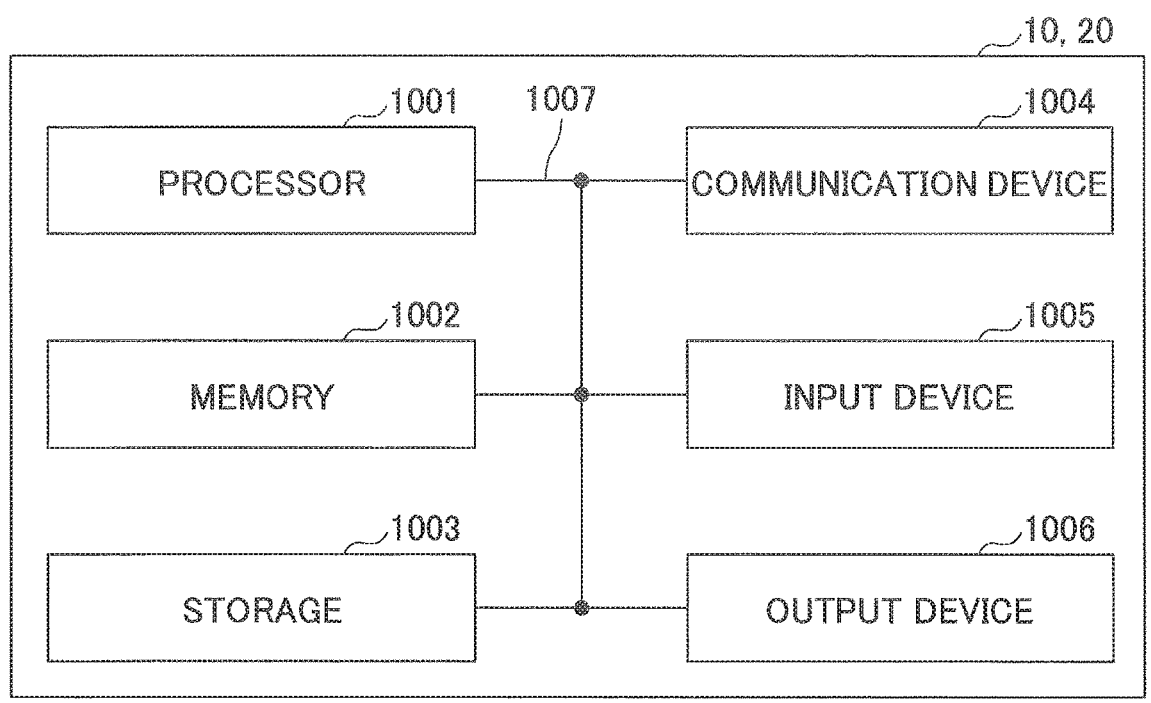
FIG. 21 is a diagram illustrating an example of a hardware configuration of a radio communication apparatus according to an embodiment of the present invention.

For example, the base station, the user equipment terminal, or the like according to the embodiment of the invention may function as a computer that performs a synchronization signal transmission method or a cell search method according to this embodiment. FIG. 21 is a diagram illustrating an example of a hardware configuration of the base station 10 or the user equipment terminal 20 according to this embodiment. Each of the base station 10 and the user equipment terminal 20 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 10 or the user equipment terminal 20 may include one or a plurality of devices illustrated in FIG. 21 or may not include some of the devices.

Each function of the base station 10 and the user equipment terminal 20 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the Zadoff-Chu sequence generation unit 101, the subcarrier mapping unit 103, the precoding unit 105, the Zadoff-Chu sequence generation unit 151, the subcarrier mapping unit 153, the muting unit 155 in the base station 10, as well as the PSS sequence estimation unit 203, the frequency offset estimation unit 205, the frequency offset compensation unit 207, the FFT unit 209, and the SSS sequence estimation unit 211 in the user equipment terminal 20 may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the Zadoff-Chu sequence generation unit 101, the subcarrier mapping unit 103, the precoding unit 105, the Zadoff-Chu sequence generation unit 151, the subcarrier mapping unit 153, the muting unit 155 in the base station 10, as well as the PSS sequence estimation unit 203, the frequency offset estimation unit 205, the frequency offset compensation unit 207, the FFT unit 209, and the SSS sequence estimation unit 211 in the user equipment terminal 20 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a synchronization signal transmission method or a cell search method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 107 and the transmission unit 157 in the base station, the reception unit 201 in the user equipment terminal 20, and the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

Each of the base station 10 and the user equipment terminal 20 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

<Supplementary Explanation>

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment terminal can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims the benefit of priority of Japanese Patent Application No. 2017-002626 filed on Jan. 11, 2017, the entire contents of which are hereby incorporated by reference.

DESCRIPTION OF NOTATIONS 10 base station
101 Zadoff-Chu sequence generation unit
103 subcarrier mapping unit
105 precoding unit
107 transmission unit
151 Zadoff-Chu sequence generation unit
153 subcarrier mapping unit
155 muting unit
157 transmission unit
20 user equipment terminal
201 reception unit
203 PSS sequence estimation unit
205 frequency offset estimation unit
207 frequency offset compensation unit
209 FFT unit
211 SSS sequence estimation unit

The invention claimed is:

1. A base station for transmitting a synchronization signal from a plurality of transmission antennas in orthogonal frequency division multiple access (OFDMA), wherein a number of the plurality of transmission antennas is larger or equal to two, the base station comprising:
 a processor configured to:
  generate a synchronization signal sequence to be used for the synchronization signal in a frequency domain,
  divide a transmission band of the synchronization signal into a plurality of frequency blocks, wherein a number of the plurality of frequency blocks is equal to the number of the plurality of transmission antennas,
  define one-to-one correspondence between the plurality of frequency blocks and the plurality of transmission antennas,
  map the synchronization signal sequence into one or more subcarriers in the plurality of frequency blocks, and
  mute transmission of the synchronization signal sequence to be transmitted from a specific transmission antenna from among the plurality of transmission antennas in the plurality of frequency blocks except for a specific frequency block corresponding one-to-one to the specific transmission antenna from among the plurality of frequency blocks; and
 a transmitter configured to transmit the synchronization signal from the plurality of transmission antennas.

2. A synchronization signal transmission method of transmitting a synchronization signal from a plurality of transmission antennas of a base station in orthogonal frequency division multiple access (OFDMA), wherein a number of the plurality of transmission antennas is larger or equal to two, the method comprising the steps of:

generating a synchronization signal sequence to be used for the synchronization signal in a frequency domain;

dividing a transmission band of the synchronization signal into a plurality of frequency blocks, wherein a number of the plurality of frequency blocks is equal to the number of the plurality of transmission antennas, defining one-to-one correspondence between the plurality of frequency blocks and the plurality of transmission antennas, mapping the synchronization signal sequence into one or more subcarriers in the plurality of frequency blocks;

muting transmission of the synchronization signal sequence to be transmitted from a specific transmission antenna from among the plurality of transmission antennas in the plurality of frequency blocks except for a specific frequency block corresponding one-to-one to the specific transmission antenna from among the plurality of frequency blocks; and transmitting the synchronization signal from the plurality of transmission antennas.

* * * * *